US011275440B2

(12) United States Patent
Haga et al.

(10) Patent No.: US 11,275,440 B2
(45) Date of Patent: Mar. 15, 2022

(54) ELECTRONIC APPARATUS AND ELECTRONIC APPARATUS OPERATION CONTROL METHOD

(71) Applicant: NLT TECHNOLOGIES, LTD., Kanagawa (JP)

(72) Inventors: Hiroshi Haga, Kanagawa (JP); Yuji Yamaguchi, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 423 days.

(21) Appl. No.: 14/933,649

(22) Filed: Nov. 5, 2015

(65) Prior Publication Data

US 2016/0132115 A1    May 12, 2016

(30) Foreign Application Priority Data

Nov. 6, 2014 (JP) .............................. JP2014-225799
Aug. 5, 2015 (JP) .............................. JP2015-155208

(51) Int. Cl.
*G06F 3/01* (2006.01)
*G06F 3/041* (2006.01)

(52) U.S. Cl.
CPC ............ *G06F 3/016* (2013.01); *G06F 3/0412* (2013.01); *G06F 2203/014* (2013.01); *G06F 2203/04112* (2013.01)

(58) Field of Classification Search
CPC ...... G06F 3/041; G06F 3/04883; G06F 3/044; G06F 3/0482; G06F 3/017; G06F 3/0488;

(Continued)

(56) References Cited

U.S. PATENT DOCUMENTS 7,952,566 B2 * 5/2011 Poupyrev ............ G06F 3/03547
345/173
8,405,618 B2 * 3/2013 Colgate ................ G06F 3/0362
345/173

(Continued)

FOREIGN PATENT DOCUMENTS

CN    102349039 A    2/2012
CN    103279247 A    9/2013

(Continued)

OTHER PUBLICATIONS

Communication dated Mar. 12, 2019 from Japanese Patent Office in counterpart JP Application No. 2015-155208.

(Continued)

*Primary Examiner* — Michael J Jansen, II
(74) *Attorney, Agent, or Firm* — Sughrue Mion, PLLC

(57) ABSTRACT

The electronic apparatus is provided with: a visual sense display unit which displays an operation screen; a touch coordinate detection unit which detects an operation content done on displayed objects; and a tactual sense presenting unit which presents a tactual sense. The electronic apparatus includes: a tactual sense presentation control module which presents a tactual sense corresponding to the displayed objects on the operation screen via the tactual sense presenting unit; an operation content acquiring module which detects whether or not a temporal change in the touch position detected on the displayed object by the touch coordinate detection unit is equal to or less than a preset threshold value and that state continues for a preset time or longer; and a sense stimulus information output control module which outputs to outside sense stimulus information corresponding to the displayed object when that state continues for the prescribed time or longer.

3 Claims, 19 Drawing Sheets

(58) Field of Classification Search
CPC ......... G06F 2203/04808; G06F 3/016; G06F 2203/04101; G06F 2203/04108; G06F 3/0412; G06F 2203/014; G06F 2203/04112; G06F 3/0416

See application file for complete search history.

(56) References Cited

U.S. PATENT DOCUMENTS

| | | | | |
|---|---|---|---|---|
| 8,736,575 | B2* | 5/2014 | Kasahara | G06F 3/0484 345/174 |
| 8,780,053 | B2* | 7/2014 | Colgate | G06F 3/016 345/173 |
| 8,836,664 | B2* | 9/2014 | Colgate | G06F 3/0421 345/173 |
| 8,952,931 | B2* | 2/2015 | Kasahara | G06F 3/04845 345/174 |
| 9,285,880 | B2* | 3/2016 | Araki | G06F 3/016 |
| 9,405,370 | B2* | 8/2016 | Yoshikawa | G06F 3/0485 |
| 9,417,695 | B2* | 8/2016 | Griffin | G06F 3/0416 |
| 9,671,897 | B2* | 6/2017 | Kasahara | G06F 3/04883 |
| 9,684,448 | B2* | 6/2017 | Dagar | G06F 3/04883 |
| 9,696,803 | B2* | 7/2017 | Cruz-Hernandez | G06F 3/017 |
| 9,696,806 | B2* | 7/2017 | Modarres | G06F 3/0412 |
| 10,073,527 | B2* | 9/2018 | Cruz-Hernandez | G06T 15/04 |
| 10,296,134 | B2* | 5/2019 | Kasahara | G06F 3/0484 |
| 10,691,333 | B2* | 6/2020 | Rhee | G06F 3/04886 |
| 2003/0071859 | A1 | 4/2003 | Takami et al. | |
| 2007/0236450 | A1* | 10/2007 | Colgate | G06F 3/0362 345/156 |
| 2008/0024459 | A1* | 1/2008 | Poupyrev | G06F 3/016 345/173 |
| 2008/0204420 | A1 | 8/2008 | Dunnigan et al. | |
| 2009/0284485 | A1* | 11/2009 | Colgate | B60K 37/06 345/173 |
| 2010/0231550 | A1* | 9/2010 | Cruz-Hernandez | G06F 3/0488 345/174 |
| 2011/0248916 | A1* | 10/2011 | Griffin | G06F 3/016 345/157 |
| 2012/0056850 | A1* | 3/2012 | Kasahara | G06F 3/0416 345/174 |
| 2012/0260164 | A1 | 10/2012 | Scheufler et al. | |
| 2013/0222303 | A1* | 8/2013 | Colgate | G06F 3/041 345/173 |
| 2013/0307789 | A1 | 11/2013 | Karamath et al. | |
| 2014/0176455 | A1* | 6/2014 | Araki | G06F 3/016 345/173 |
| 2014/0232687 | A1* | 8/2014 | Kasahara | G06F 3/04883 345/174 |
| 2014/0320436 | A1 | 10/2014 | Modarres et al. | |
| 2014/0347296 | A1* | 11/2014 | Yoshikawa | G06F 3/016 345/173 |
| 2015/0123927 | A1* | 5/2015 | Kasahara | G06F 3/0416 345/173 |
| 2015/0302774 | A1* | 10/2015 | Dagar | G06F 3/04886 345/173 |
| 2015/0316986 | A1* | 11/2015 | Xue | G06F 3/041 345/173 |
| 2016/0004309 | A1* | 1/2016 | Modarres | G06F 3/016 345/173 |
| 2016/0048297 | A1* | 2/2016 | Rhee | G06F 3/04886 715/773 |
| 2016/0342208 | A1* | 11/2016 | Levesque | G06F 3/041 |
| 2017/0235417 | A1* | 8/2017 | Kasahara | G06F 3/0416 345/174 |
| 2017/0322631 | A1* | 11/2017 | Cruz-Hernandez | G06F 3/0488 |

FOREIGN PATENT DOCUMENTS

| | | |
|---|---|---|
| CN | 103838560 A | 6/2014 |
| JP | 2003-016502 A | 1/2003 |
| JP | 2003-67119 A | 3/2003 |
| JP | 2005-216110 A | 8/2005 |
| JP | 2007-310496 A | 11/2007 |
| JP | 2009-169612 A | 7/2009 |
| JP | 2009-241924 A | 10/2009 |
| JP | 2010-102508 A | 5/2010 |
| JP | 2011-248884 A | 12/2011 |
| JP | 2012-178103 A | 9/2012 |
| JP | 2013-73601 A | 4/2013 |
| JP | 2013-514237 A | 4/2013 |
| JP | 2014-131133 A | 7/2014 |
| WO | 2011/052484 A1 | 5/2011 |
| WO | 2012/108203 A1 | 8/2012 |
| WO | 2014/176532 A1 | 10/2014 |

OTHER PUBLICATIONS

Communication dated Apr. 28, 2019 from the China National Intellectual Property of Administration in counterpart Application No. 201510732226.5.

* cited by examiner

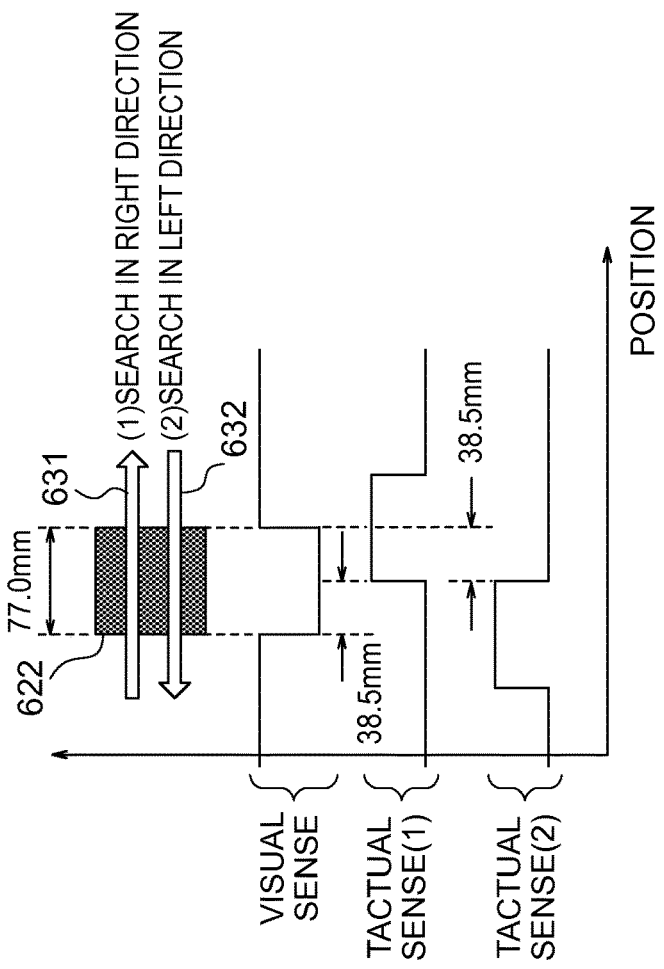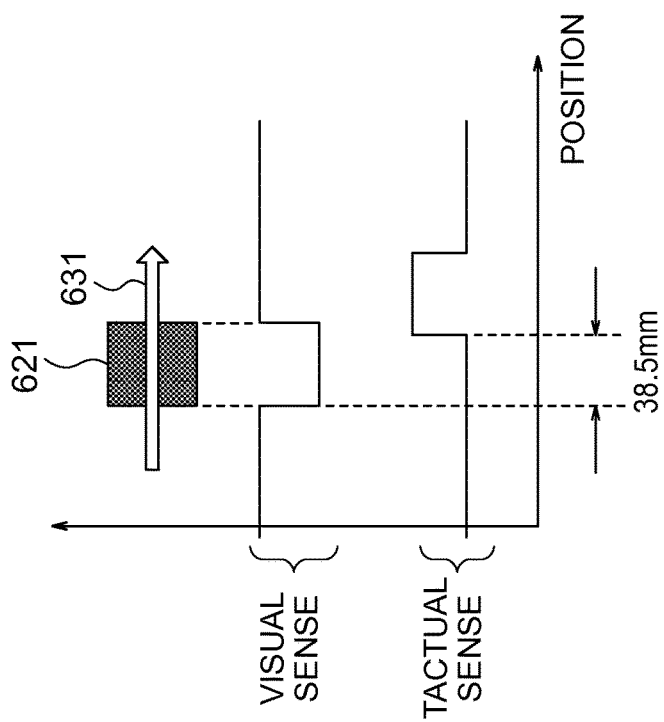

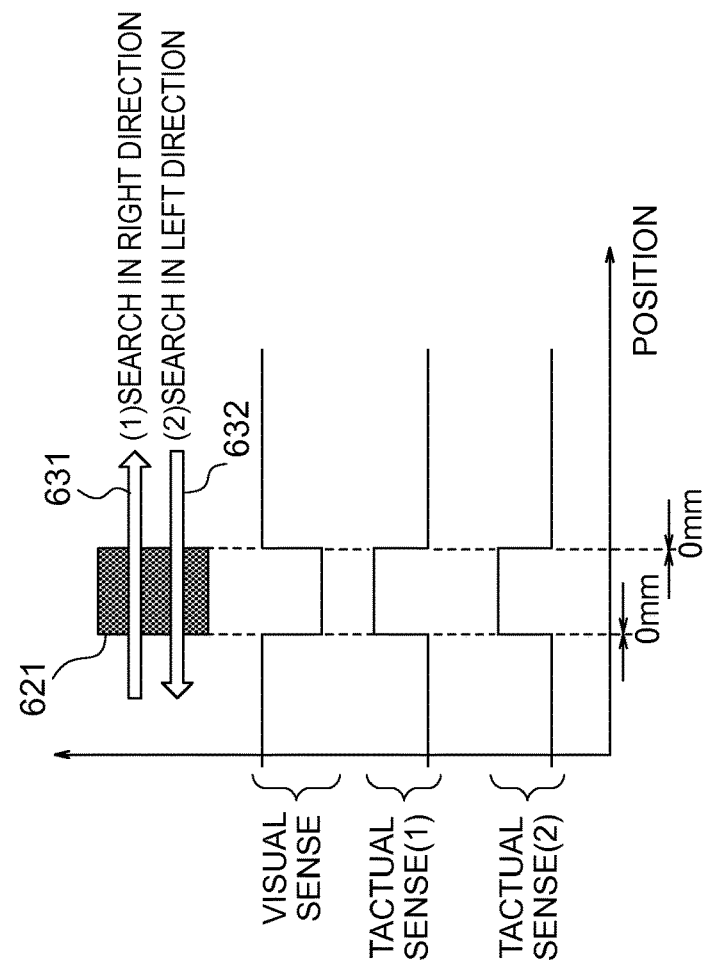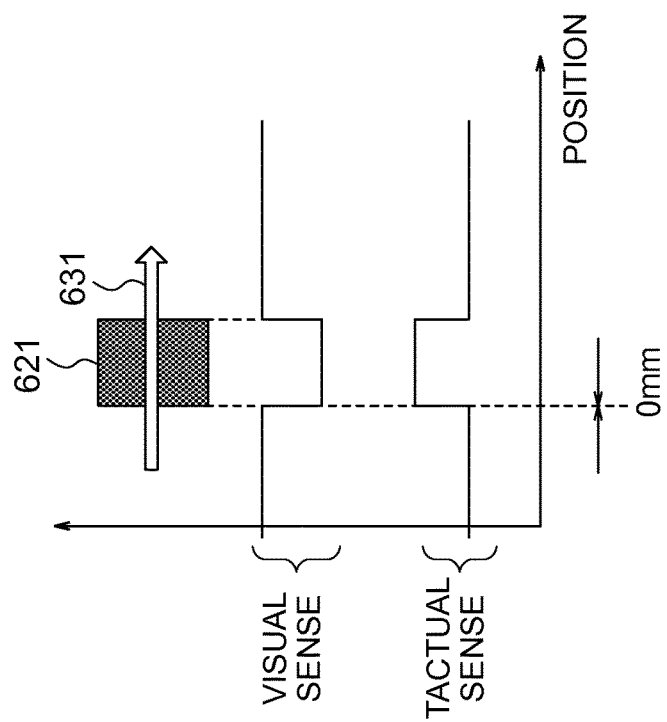

ELECTRONIC APPARATUS AND ELECTRONIC APPARATUS OPERATION CONTROL METHOD

CROSS-REFERENCE TO RELATED APPLICATION

This application is based upon and claims the benefit of priority from Japanese patent application No. 2014-225799, filed on Nov. 6, 2014 and Japanese patent application No. 2015-155208, filed on Aug. 5, 2015, the disclosure of which is incorporated herein in its entirety by reference.

BACKGROUND OF THE INVENTION

1. Field of the Invention

The present invention relates to an electronic apparatus and an operation control method of the electronic apparatus. More specifically, an electronic apparatus and the like which can be operated easily by those with impaired vision.

2. Description of the Related Art

Conventionally, a display device on which a touch panel with which input can be done by fingers is loaded contributes to achieving user-friendly interactive operability by being mounted to a system that controls the display content and the apparatus actions according to the input. Thus, electronic apparatuses to which a touch panel is mounted such as smartphones, tablet terminals, and the like are being rapidly spread.

Further, among such type of electronic apparatuses, the number of display devices provided with a touch panel is becoming increased even in highly-public apparatuses that are assumed to be operated by an unspecified large number of people. More specific examples thereof are ticket vending machines at railway stations, ATMs (Automated Teller Machines) at banks, multimedia kiosk terminal devices (e.g., "Loppi (registered trademark) of Lawson, Inc., Fami port (registered trademark) of Family Mart Co., Ltd., etc.), vending machines of drinking water, and the like.

In the meantime, the surface of the display device with a touch panel is evenly hard, so that same tactual senses are felt by touching any of the sections displayed on the screen. Thus, it is practically impossible to perceive which part of the touch panel is to be touched to make an effective input or to know whether or not an effective input is done without relying on a visual sense (without looking at the panel).

Even people with impaired vision can operate the apparatuses provided with independent operation keys such as a remote controller of a television receiver, a conventional type mobile phone terminal (feature phone), a keyboard of a personal computer, and the like just by memorizing positions and layout of the operation keys. However, it is almost impossible for those with impaired vision to operate the electronic apparatus provided with a display device with a touch panel. Especially, a measure for enabling those with impaired vision to use the apparatuses such as the above-described ticket vending machines, ATMs, and the like easily is demanded.

Japanese Unexamined Patent Publication 2011-248884 (Patent Document 1) discloses a technique with which: electrodes are embedded in specific positions on the front surface of a display device with a touch panel; voltage signals of a specific frequency are applied to the electrodes to electrically oscillate the sections where the electrodes are embedded; and tactual senses (a sense of texture, a sense of coarseness) are presented to the finger of the user who touches the device surface by utilizing it.

However, with this technique, a sense of texture is also given to the wirings provided for transmitting the voltage signals to the electrodes. Especially, a large number of electrodes are embedded to give a sense of texture to a large number of sections, complicated wirings are required. Thus, a sense of texture is also given to undesired sections.

Further, this technique is capable of giving a sense of texture only to the section where the electrode is embedded in advance. Changing the positions and the number of sections where a sense of texture is presented according to the displayed object requires rearrangement of the electrodes, so that it is practically impossible.

Further, as other technical documents related to that, there are following documents. Japanese Unexamined Patent Publication 2009-169612 (Patent Document 2) discloses a technique which gives feedback to the fingertip of the operating user by oscillating the touch panel, which is a technique with which the size of the touch panel is reduced and low power consumption is achieved. Japanese Unexamined Patent Publication 2003-016502 (Patent Document 3) discloses a technique with which the touch panel is oscillated and the content of the key that is touched by the user is taken as the input content at the point where the finger is detached.

Japanese Unexamined Patent Publication 2014-131133 (Patent Document 4) discloses a technique with which, when performing a setting operation of what is called an all-in-one device in which functions of a printer, a copying machine, and the like are combined according to the positions and time at which the user touches the touch panel, reads out the setting content by a voice and the touch panel is oscillated by following a pattern according to the setting.

SUMMARY OF THE INVENTION

The following analysis has been made by the present inventors:

With the touch-panel display device provided with a tactual sense presenting device shown in the related technique depicted in Patent Document 1 described above, it is pretty much possible for the user to find out the position of the displayed object as a target of touch input without relying on a visual sense.

However, in order to actually operate the apparats without relying on the visual sense, it is necessary to memorize the layout of each displayed object and the operation content corresponding to each of those in advance. It is because the thing that can be found through the tactual sense is only "the position of the displayed object", and there is no way of knowing what kind of operation content each displayed object corresponds to without relying on the visual sense.

As described above, a measure for enabling those with impaired vision to easily use the apparatuses that are used in highly public occasions such as ticket vending machines and the ATMs is desired. However, the layout of the displayed objects and the operation contents corresponding thereto in each of those apparatuses are of infinite variety for each apparatus or for each scene of executing an input operation even in the same apparatus. It is practically not possible to use a standardized common format for the operation system such as so-called the QWERTY layout of keyboards of personal computers in all of those apparatuses or in all of the scenes of executing input operations.

Thus, it is extremely difficult for the user to memorize in advance the layout of the displayed objects and the operation contents which vary for each of those apparatuses. As a measure for enabling those with impaired vision to easily use the apparatuses, it is still insufficient. Further, with the related technique depicted in Patent Document 1, there are issues such as "a sense of texture is given to the undesired section" that is described above, "it is practically impossible to change the layout and the number", etc. A technique for overcoming the above-described points is not depicted in any of remaining Patent Documents 2 to 4.

It is therefore an exemplary object of the present invention to provide an electronic apparatus, an operation control method of the electronic apparatus, and a program thereof, which can be easily used even by those with impaired vision by utilizing a tactual sense (a sense of texture) presented at positions corresponding to displayed objects.

In order to achieve the foregoing object, the electronic apparatus according to the present invention is an electronic apparatus including: a visual sense display unit which displays an operation screen including an operation target range for a user; a touch coordinate detection unit which detects a content of a touch operation done by the user on a displayed object that is displayed within the operation target range; and a tactual sense presenting unit which presents a tactual sense that can be perceived by the user on the operation screen, and the electronic apparatus includes: a tactual sense presentation control module which presents a tactual sense corresponding to the displayed object to the user on the operation screen via the tactual sense presenting unit; an operation content acquiring module which detects whether or not a temporal change in a touch position detected on the displayed object by the touch coordinate detection unit is equal to or less than a preset threshold value and whether or not such state continues for a preset time or longer; and a sense stimulus information output control module which outputs sense stimulus information corresponding to the displayed object to outside via a sense stimulus information output unit provided in advance, when the state continues for the preset time set or longer.

In order to achieve the foregoing object, the operation control method of the electronic apparatus according to the present invention is an operation control method for controlling operations of an electronic apparatus including a visual sense display unit which displays an operation screen including an operation target range for a user, wherein: an operation screen display control module creates the operation screen that is a content acquired when an application execution module executes processing, and displays the operation screen on the visual sense display unit; a tactual sense presentation control module presents a tactual sense corresponding to the operation screen that can be perceived by the user within the operation target range on the operation screen via a tactual sense presenting unit; a touch coordinate detection unit detects a content of a touch operation done by the user on a displayed object displayed within the operation target range; an operation content acquiring module detects whether or not a temporal change in a touch position detected on the displayed object is equal to or less than a preset threshold value and such state continues for a preset time or longer; and a sense stimulus information output control module outputs sense stimulus information corresponding to the displayed object to outside via a sense stimulus information output unit provided in advance when the state continues for the present time or longer.

As described above, the present invention is structured to present a tactual sense corresponding to the displayed object and to output a sound corresponding to the displayed object when a state where a temporal change in the touching position is equal to or less than a threshold value continues, so that the user can perceive the tactual sense and perform the operation even if the user does not memorize the layout of the displayed objects and the operation contents corresponding thereto in advance. This makes it possible to provide the electronic apparatus and the operation control method of the electronic apparatus, which can be easily used by those with impaired vision.

In the meantime, the present invention is structured to output a sound corresponding to the displayed object when a state where a temporal change in the touching position is equal to or less than a threshold value continues. Thus, no sound is outputted in a case where those who are not suffering from impaired vision perform operations such as tapping and the like on the displayed object. Thus, those who are not visually impaired can use it comfortably since input operations can be done in a state where an originally unnecessary sound is not outputted.

As described, the present invention can provide the electronic apparatus and the operation control method of the electronic apparatus, which can be used easily or comfortably by those with or without impaired vision.

BRIEF DESCRIPTION OF THE DRAWINGS

FIGS. 8A-8D show explanatory charts regarding an operation method of the electronic apparatus shown in FIG. 1 and FIG. 2, in which FIG. 8A is a state where an operation screen display control module displays an operation screen on a visual sense display unit (an operation target range), FIG. 8B is a state where the user is placing a finger on the operation target range and performing a search, FIG. 8C is a state where the user keeps pressing a specific position on the operation target range, and FIG. 8D is a state where the user is tapping a specific position on the operation target range;

FIGS. 10A and 10B show pictures of a device used for measuring the finger speed and a hand of the user, in which FIG. 10A is a picture of a case where the user is not searching an operation target region and FIG. 10B is a picture of a case where the user is searching the target region;

FIGS. 12A and 12B show charts for describing shift in the position of a displayed object and the positions of tactual senses in the electronic apparatus according to the related technique, in which FIG. 12A is a chart showing the position of the displayed object and the position where the finger is at when a tactual sense is generated in a case where the finger is moved in the right direction and FIG. 12B is a chart showing the position of the displayed object and positions where the finger is at when tactual senses are generated in a case where the finger is moved in the left and right directions;

FIGS. 14A and 14B show charts for describing shift in the position of a displayed object and the positions of tactual senses in the electronic apparatus according to the first exemplary embodiment, in which FIG. 14A is a chart showing the position of the displayed object and the position where the finger is at when a tactual sense is generated in a case where the finger is moved in the right direction and FIG. 14B is a chart showing the position of the displayed object and the positions where the finger is at when tactual senses are generated in a case where the finger is moved in the left and right directions;

DETAILED DESCRIPTION OF THE PREFERRED EMBODIMENTS

First Exemplary Embodiment

Figure 1:
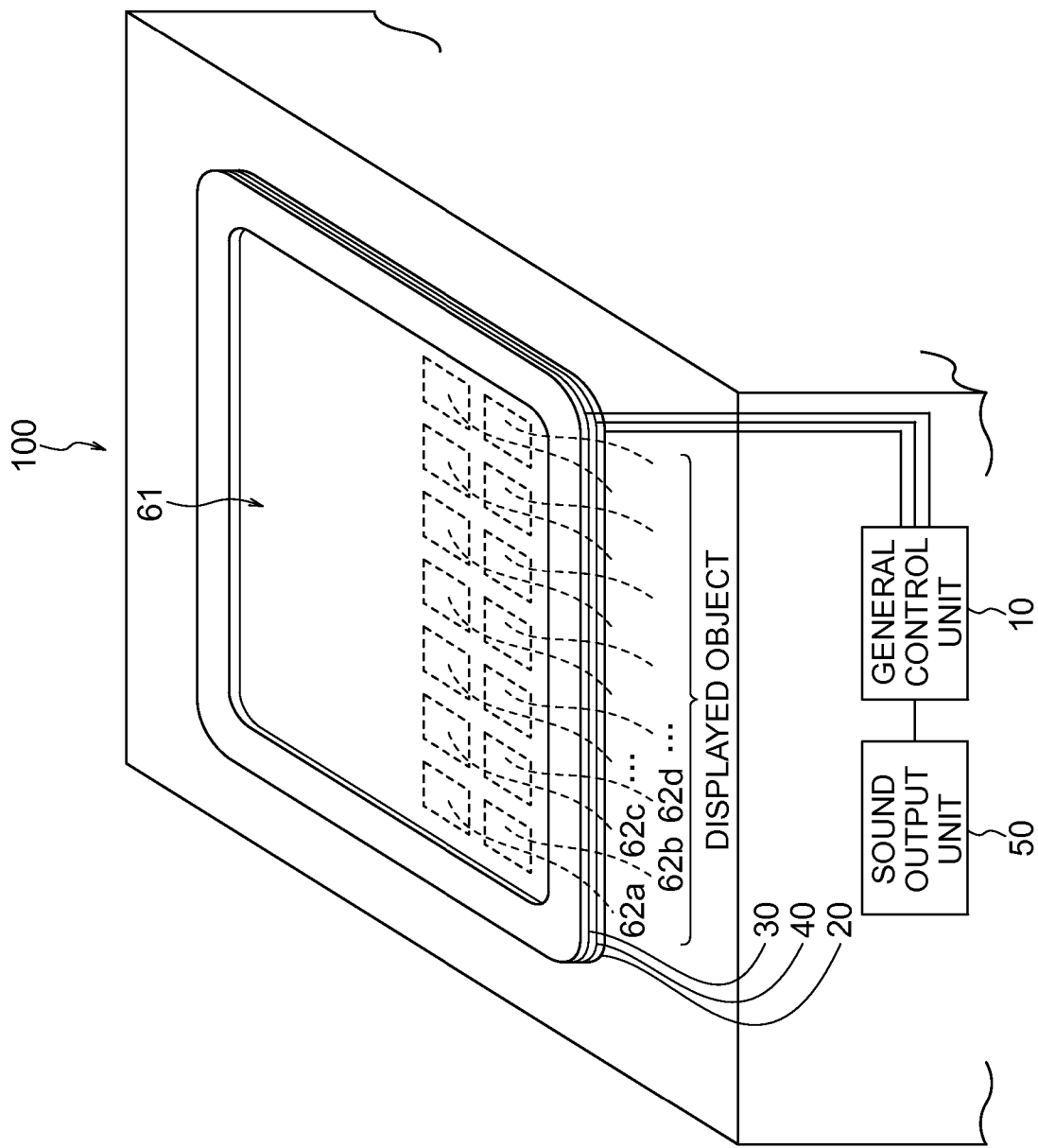
FIG. 1 is an explanatory chart showing structures of an electronic apparatus according to a first exemplary embodiment.

Hereinafter, the structure of a first exemplary embodiment of the present invention will be described by referring to FIG. 1.

An electronic apparatus 100 according to the first exemplary embodiment of the present invention is an electronic apparatus which is provided with: a visual sense display unit 20 which displays an operation screen including an operation target range 61 to be operated by a user; a touch coordinate detection unit 30 which detects a content of a touch operation done by the user for displayed objects 62a, 62b, etc. displayed within the operation target range; and a tactual sense presenting unit 40 which presents a tactual sense that can be perceived by the user on the operation screen. Note here that the electronic apparatus 100 includes: a tactual sense presentation control module 13 which presents a tactual sense corresponding to the displayed object to the user on the operation screen via the tactual sense presenting unit; an operation content acquiring module 14 which detects whether or not a temporal change in the touch position detected on the displayed object by the touch coordinate detection unit is equal to or less than a preset threshold value and that state continues for a preset time or longer; and a sense stimulus information output control module (a sound output control module 15) which outputs to the outside sense stimulus information corresponding to the displayed object via a sense stimulus information output unit (a sound output unit 50) provided in advance. The sense stimulus information can be structured as a sound.

Note here that the tactual sense presenting unit 40 is structured to be capable of presenting different tactual senses simultaneously in a first region and a second region on the operation screen. Further, the general control unit 10 includes the tactual sense presenting module 13 which drives the tactual sense presenting unit 40 for presenting a tactual sense that can be perceived by the user at a point before the user performs a touch operation on the position corresponding to the generated displayed object on the operation screen.

Further, the operation content acquiring module 14 is controlled to execute prescribed functions corresponded to the displayed objects 62a, 62b, etc. in a case where an action of tapping on a position corresponding to the displayed objects is detected.

With the above-described structures, the electronic apparatus 100 can be easily used even by those with impaired vision through utilizing the presented tactual sense (a sense of texture).

This will be described in more details.

FIG. 1 is an explanatory chart showing the structures of the electronic apparatus 100 according to the first exemplary embodiment of the present invention. The electronic apparatus 100 includes: the visual sense display unit 20; the touch coordinate detection unit 30; the tactual sense presenting unit 40; and the general control unit 10 which performs general controls of the entire actions of those units. The visual sense display unit 20 is typically a liquid crystal display device, which displays to the user an operation screen acquired as a result of processing performed by the general control unit 10.

The touch coordinate detection unit 30 is typically an optical touch sensor provided in the frame part of the visual sense display unit 20 that is a liquid crystal display device, which accepts operations such as a touch and the like done by the user on the operation screen displayed on the visual sense display unit 20 and inputs the point at which the operation is done on the operation screen as coordinate input information to the general control unit 10.

The tactual sense presenting unit 40 is a tactual sense presenting panel that is laminated on the surface of the visual sense display unit 20. The visual sense display unit 20, the touch coordinate detection unit 30, and the tactual sense presenting unit 40 have the common operation target range 61. The operation target range 61 is a range where the visual sense display unit 20 displays the operation screen and also a range where the touch coordinate detection unit 30 accepts operations done by the user. While FIG. 1 shows a state where the visual sense display unit 20, the tactual sense presenting unit 40, and the touch coordinate detection unit 30 are stacked in this order from the bottom, the order thereof is not specifically limited thereto as long as the operation target range 61 functions in common.

While the more specific structures will be described later, the tactual sense presenting unit 40 presents a tactual sense (a sense of texture) at the positions corresponding to each of the specific displayed objects 62a, 62b, etc. (such as operation buttons) in the operation target range 61 for enabling the user to discriminate the positions of the displayed objects only with the tactual sense.

Figure 2:
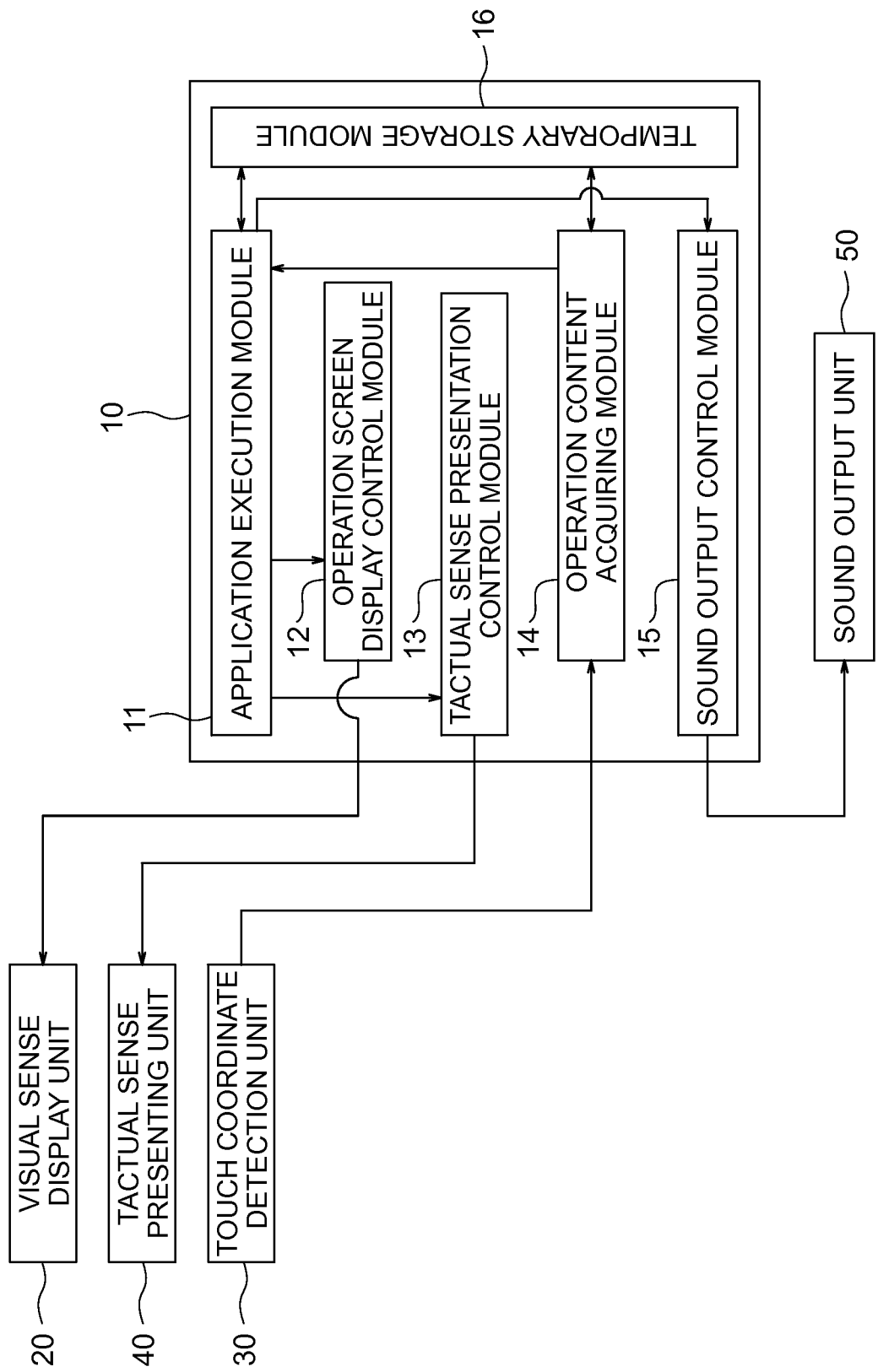
FIG. 2 is an explanatory chart which conceptually shows more detailed structures of a general control unit of the electronic apparatus shown in FIG. 1.

The general control unit 10 is typically a processor as the main unit for executing computer programs and functions as each of operation modules to be described in following paragraphs by execution of an operation control program. Further, a sound output module 50 is also provided to the general control unit 10. The sound output unit 50 is typically a speaker or an earphone, which outputs to the user a sound as a result acquired by executing processing by the general control unit 10. Note that the general control unit 10 is not necessarily required to be within a same casing as that of the visual sense display unit 20, the touch coordinate detection unit 30, and the tactual sense presenting unit 40;

FIG. 2 is an explanatory chart which conceptually shows the more detailed structures of the general control unit 10 of the electronic apparatus 100 shown in FIG. 1. The general control unit 10 functions as each of the application execution module 11, the operation screen display control module 12, the tactual sense presentation control module 13, the operation content acquiring module 14, and the sound output control module 15 by executions of the operation control program. Further, the general control unit 10 is also provided with a temporary storage module 16 which temporarily stores various kinds of data (time parameter, touch position vector, and the like to be described later) which are required for the actions of the operation control program.

The application execution module 11 executes typical actions corresponding to the input operations of the user done by the visual sense display unit 20 and the touch coordinate detection unit 30, and displays the operation screen as a result thereof on the visual sense display unit 20. Further, the application execution module 11 gives an action instruction also to the tactual sense presenting unit 40 according to the content of the operation screen displayed on the visual sense display unit 20. Furthermore, the application execution module 11 gives an instruction to the sound output control module 15 to designate the sound to be reproduced and to reproduce that sound.

The typical actions herein in cases where the electronic apparatus 100 is a ticket vending machine or other vending machines are selling of the thing selected by the user, and the like. Further, when the electronic apparatus 100 is an ATM of a bank, it is processing of reception/payment of money, direct deposit, money transfer, or the like depending on the operation of the user. Needless to mention, peculiar mechanisms and the like for performing those actions are provided to the electronic apparatus 100. However, those mechanisms are not necessary to be described in details herein, so that illustrations thereof are not specifically provided in the drawings.

The operation screen display control module 12 displays the operation screen corresponding to the action executed by the application execution module 11 on the visual sense display unit 20. The tactual sense presentation control module 13 controls the tactual sense presenting unit 40 to present a tactual sense (a sense of texture) to the positions corresponding to the specific displayed objects 62a, 62b, etc. on the operation screen.

The operation content acquiring module 14 detects the operation content intended by the user from the coordinate input information that is the operation content inputted to the touch coordinate detection unit 30 inputted by the user on the displayed operation screen, and gives the detected operation content to the application execution module 11. The sound output control module 15 receives the output from the application execution module 11, and outputs the sound designated by the application execution module 11 via the sound output unit 50.

First Exemplary Embodiment: Regarding Tactual Sense Presenting Unit

Figure 3:
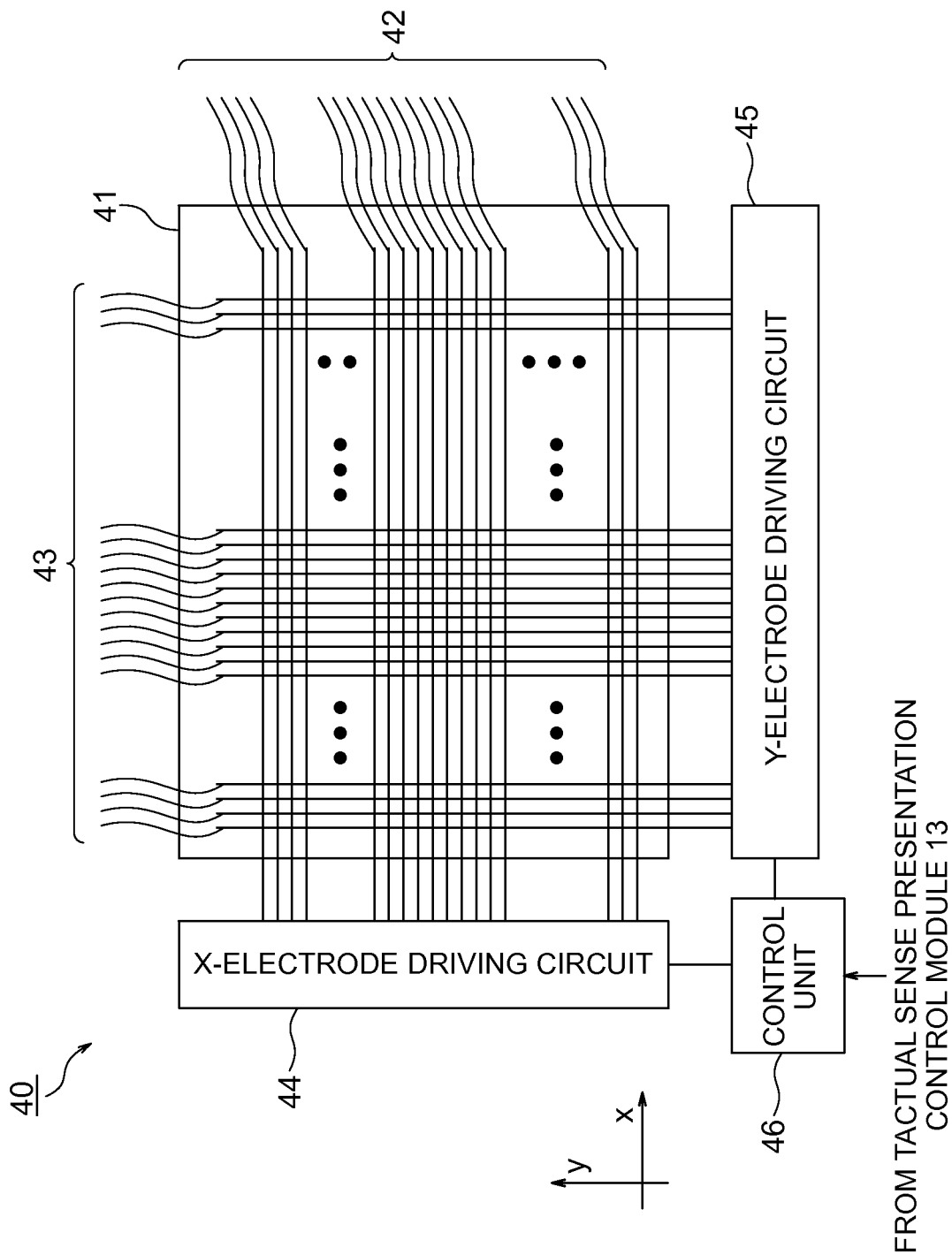
FIG. 3 is an explanatory chart which conceptually shows more detailed structure of a tactual sense presenting unit of the electronic apparatus shown in FIG. 1.

FIG. 3 is an explanatory chart which conceptually shows the more detailed structures of the tactual sense presenting unit 40 of the electronic apparatus 100 shown in FIG. 1. The tactual sense presenting unit 40 is structured with: a plurality of X-electrodes 42 extended along the x direction on a flat supporting substrate 41; a plurality of Y-electrodes 43 extended along the y direction that is orthogonal to the X-electrodes 42 on the supporting substrate 41; an X-electrode driving circuit 44 connected to each of the X-electrodes 42; a Y-electrode driving circuit 45 connected to each of the Y-electrodes 43; and a control unit 46 connected to each of the X-electrode driving circuit 44 and the Y-electrode driving circuit 45.

The X-electrode 42 and the Y-electrode 43 intersect with each other at intersection part thereof via an insulating film to keep them electrically insulated. Further, an insulating film is formed on the X-electrodes 42 and the Y-electrodes 43 to electrically insulate between the X-electrodes 42 and a finger and between the Y-electrodes 43 and the finger when the user touches the surface of the electronic apparatus 100 by the finger from the above.

The control unit 46 controls the X-electrode driving circuit 44 and the Y-electrode driving circuit 45 based on the information regarding the target region to present a sense of texture inputted from the tactual sense presentation control module 13. The X-electrode driving circuit 44 and the Y-electrode driving circuit 45 apply a voltage signal of a required frequency to the electrodes in a required range out of the X-electrodes 42 or the Y-electrodes 43 according to the control information inputted from the control unit 46.

Figure 4:
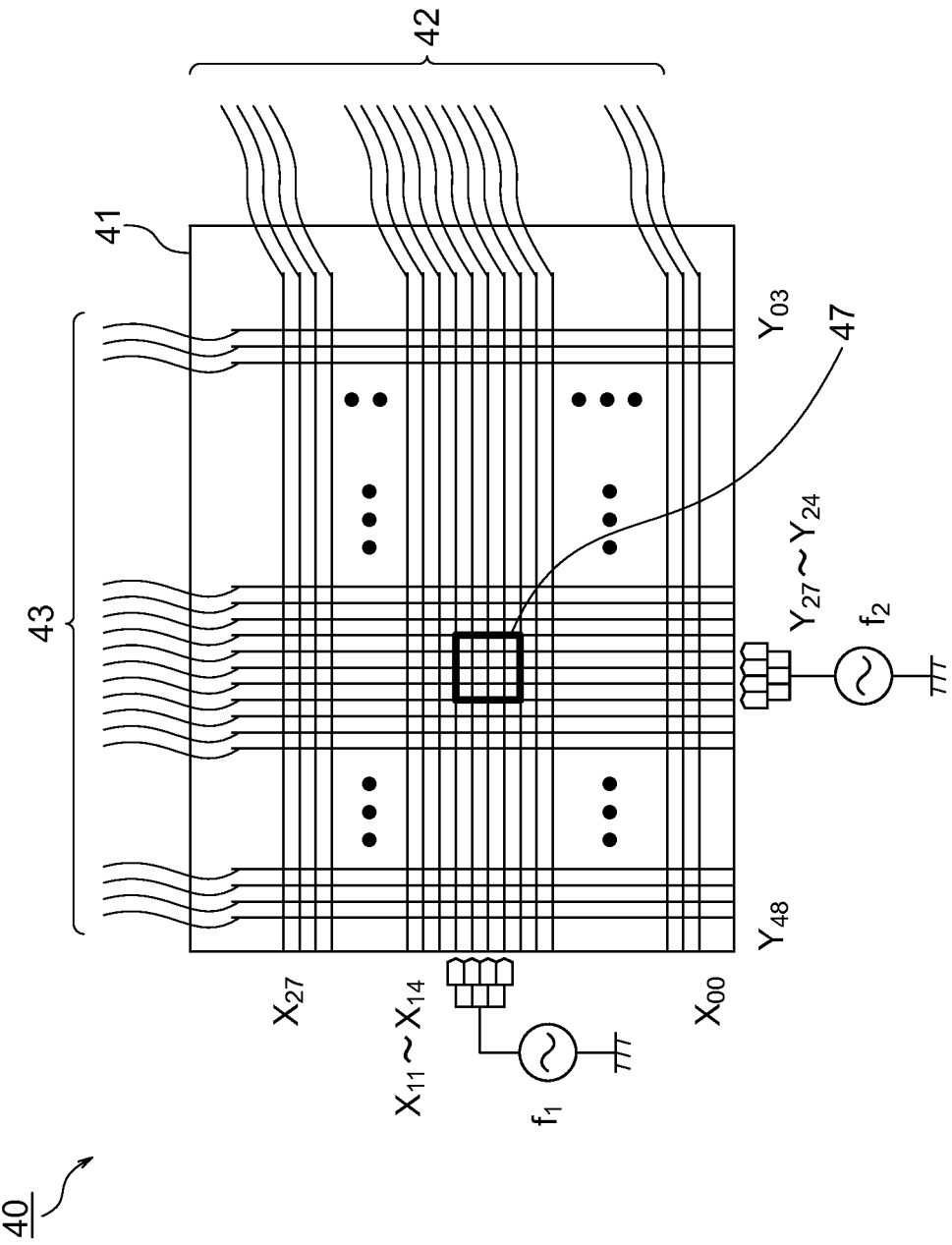
FIG. 4 is an explanatory chart showing a driving method of the tactual sense presenting unit shown in FIG. 3.

FIG. 4 is an explanatory chart showing a driving method of the tactual sense presenting unit 40 shown in FIG. 3. Note here that each of the X-electrodes 42 and the Y-electrodes 43 is discriminated through applying different reference symbols by each of the electrodes. That is, in the case shown in FIG. 4, twenty-eight X-electrodes 42 and forty-six Y-electrodes 43 are formed on the supporting substrate 41, and each of the X-electrodes 42 is referred to as $X_{00}$ to $X_{27}$ from the bottom towards the upper direction while each of the Y-electrodes 43 is referred to as $Y_{03}$ to $Y_{48}$ from the right towards the left direction.

Further, the region where a sense of texture is to be presented is referred to as a target region 47. The target region 47 is a range of $X_1$ to $X_{14}$ of the X-electrodes 42 and in a range of $Y_{24}$ to $Y_{27}$ of the Y-electrodes 43. The control unit 46 gives a control signal to the X-electrode driving circuit 44 and the Y-electrode driving circuit 45 based on the information of the target region 47 given from outside.

Upon receiving the control signal, the X-electrode driving circuit 44 applies a voltage signal of a frequency $f_1=1000$ Hz to $X_{11}$ to $X_{14}$, and the Y-electrode driving circuit 45 applies a voltage signal of a frequency $f_2=1240$ Hz to $Y_{24}$ to $Y_{27}$. Note here that the X-electrode driving circuit 44 and the Y-electrode driving circuit 45 ground the X-electrodes 42 and the Y-electrodes 43 not corresponding to those in the case shown in FIG. 4 in order to prevent the voltage from being induced by capacitance coupling of the electrodes. Further, instead of grounding, a direct current voltage or a voltage signal of a frequency of 2240 Hz or higher may be applied (the reason therefore will be described later).

When the signals described above are applied to the X-electrodes 42 and the Y-electrodes 43 and the surface of the tactual sense presenting unit 40 is traced by a finger, a sense of texture is perceived only in the target region 47 where $X_{11}$ to $X_{14}$ and $Y_{24}$ to $Y_{27}$ intersect with each other. Through selecting the electrodes to apply the voltage signals arbitrarily, a sense of texture can be presented in an arbitrary prescribed region. Further, through selecting all the X-electrodes and all the Y-electrodes, it is also possible to present a sense of texture in the entire region that includes all the intersection parts between the X-electrodes and the Y-electrodes.

The inventors, et al. of the present invention have verified by experiments that a sense of texture is not presented in the region excluding the target region 47 from the region on the electrodes of $X_1$ to $X_{14}$ and also in the region excluding the target region 47 from the electrodes of $Y_{24}$ to $Y_{27}$. That is, the inventors, et al. of the present invention have verified that fingers of human beings do not perceive a sense of texture when the frequency of the voltage signals applied to the electrodes is 1000 Hz or 1240 Hz.

In the meantime, in the target region 47, the X-electrodes to which the voltage signal of $f_1$=1000 Hz is applied and the Y-electrodes to which the voltage signal of $f_2$=1240 Hz is applied are neighboring to each other. Thus, a beat known in the field of wave motions is generated. Hereinafter, a mechanism of presenting a sense of texture due to a beat will be described.

Figure 5:
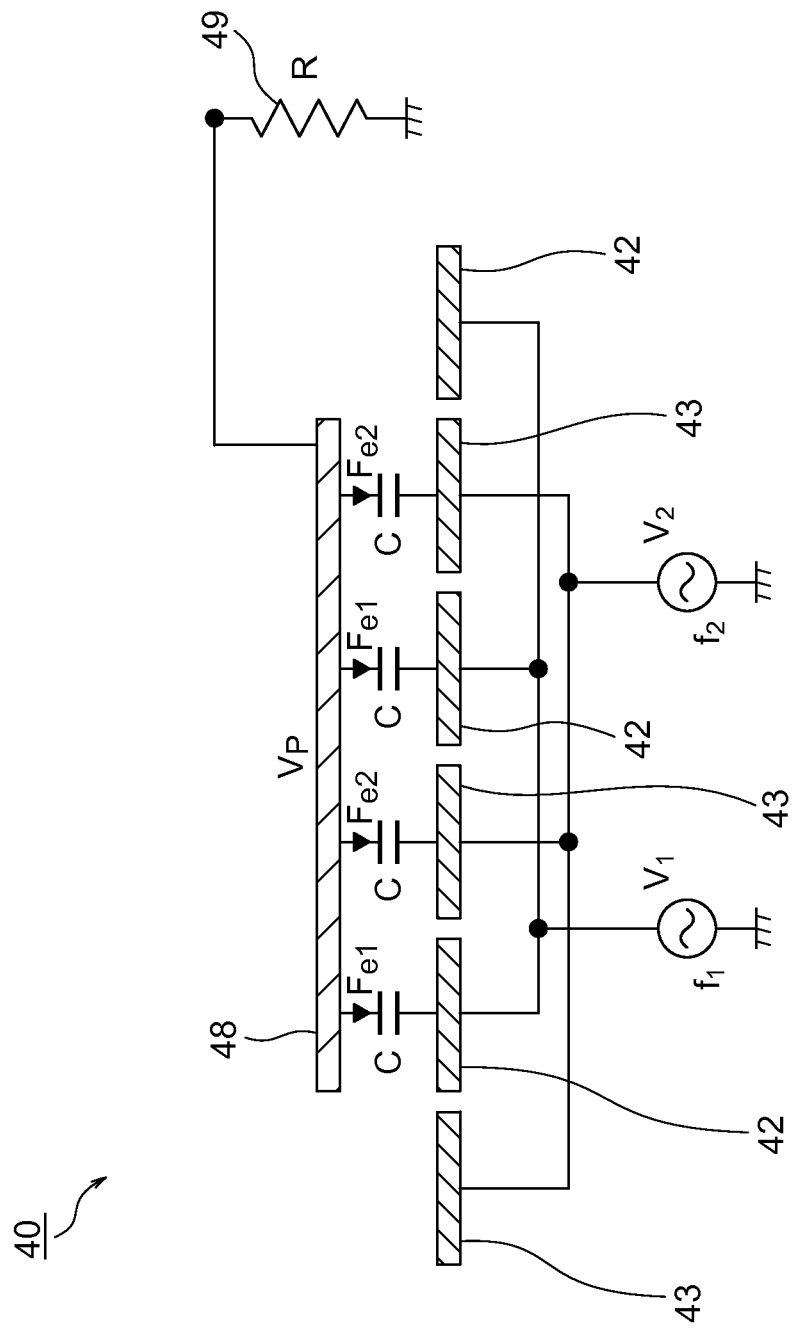
FIG. 5 is an explanatory chart showing a sectional view model of the tactual sense presenting unit shown in FIG. 3 and FIG. 4.

FIG. 5 is an explanatory chart showing a sectional view model of the tactual sense presenting unit 40 shown in FIG. 3 and FIG. 4. As described above, a plurality of X-electrodes 42 and a plurality of Y-electrodes 43 are disposed to be neighboring to each other on the flat supporting substrate 41 (not shown in FIG. 5). Note here that an electrode 48 as a model of a finger is disposed at a position opposing to the two X-electrodes 42 and two Y-electrodes 43 disposed within the target region 47 out of the X-electrodes 42 and the Y-electrodes 43. Human bodies exhibit a grounding effect, so that the electrode 48 can be formed as a model that is grounded via a resistance 49 having a resistance value R.

Now, a voltage signal $V_1$ expressed by $V_1$=Acos($2\pi f_1 t$) is applied to the X-electrodes 42 within the target region 47. The amplitude of the voltage signal $V_1$ is A, the frequency is $f_1$, and t shows time. Further, a voltage signal $V_2$ expressed by $V_2$=Acos($2\pi f_2 t$) is applied to the Y-electrodes 43 within the target region 47. The amplitude of the voltage signal $V_2$ is A that is equivalent to the amplitude of the voltage signal $V_1$, and the frequency is $f_2$.

A section between the electrode 48 and each of the X-electrodes 42 within the target region 47 can be formed as a model as a parallel flat plate capacitor having a static capacitance C, and a section between the electrode 48 and each of the Y-electrodes 43 within the target region 47 can be formed as a model as a parallel flat plate capacitor having a static capacitance C.

At this time, a voltage $V_P$ generated in the electrode 48 becomes $V_P$=($V_1+V_2$)/2 when the resistance value is sufficiently high.

As shown in FIG. 5, the static electricity force worked between a single X-electrode 42 and the electrode 48 that is a model of a finger is expressed as $F_{e1}$. $F_{e1}$ can be acquired as follows by using a formula known as a working force between the electrodes on a parallel plate capacitor. Note that ε is a permittivity of the insulating film on the X-electrodes, and S is an electrode area of the parallel plate capacitor.

$$F_{e1} = \frac{1}{2\varepsilon S}\left(C\frac{V_2 - V_1}{2}\right)^2 \qquad \text{(Expression 1)}$$

Similarly, when the static electricity force worked between a single Y-electrode 43 and the electrode 48 that is a model of a finger is expressed as $F_{e2}$, $F_{e2}$ can be acquired as follows.

$$F_{e2} = \frac{1}{2\varepsilon S}\left(C\frac{V_1 - V_2}{2}\right)^2 \qquad \text{(Expression 2)}$$

If the space between the electrodes is so minute that the static electricity force $F_{e1}$ and the static electricity force $F_{e2}$ cannot be discriminated with a fingertip, it is considered that the force that is the sum of each of $F_{e1}$ and $F_{e2}$ works on the finger in a macroscopic manner. The total force F of all the forces working on the electrode 48 that is the model of a finger can be acquired as follows by using $V_1$, $V_2$, and the values of Expression 1 and Expression 2 mentioned above since F=2 ($F_{e1}+F_{e2}$) from FIG. 3.

$$F = \frac{A^2 C^2}{2\varepsilon S}\{1 - \cos 2\pi (f_1 + f_2)t\}\{1 - \cos 2\pi (f_1 - f_2)t\} \qquad \text{(Expression 3)}$$

From (Expression 3), it can be found that the total force F of all the forces working on the modeled electrode 48 is acquired by multiplying a frequency function where the value range is [0, 2] and the frequency is the absolute value of ($f_1-f_2$) on a frequency function where the value range is [0, $A^2 C^2/(\varepsilon S)$] and the frequency is ($f_1+f_2$). The frequency of the envelope curve thereof is the absolute value of ($f_1-f_2$).

In this basic embodiment, the frequency $f_1$ is 1000 Hz and the frequency $f_2$ is 1240 Hz, so that the absolute value of the difference therebetween is 240 Hz. Thus, the attraction F working on the finger changes at 240 Hz as shown in (Expression 3). Therefore, when a human being traces the surface of the tactual sense presenting unit 40 by a finger, a change of a friction force occurs at the frequency of 240 Hz. 240 Hz is the frequency at which the mechanical receptors of the skin of human beings exhibit the sensitivity, so that a sense of texture can be perceived.

Further, the inventors, et al. of the present invention have verified the presence of the perception of a sense of texture for the frequencies of the voltage signals. As a result of applying the same voltage signals to all the X-electrodes 42 and the Y-electrodes 43 on the supporting substrate 41 and checking the presence of a sense of texture, it was verified that a sense of texture was perceived in a case where the frequency of the voltage signal was larger than 5 Hz and less than 500 Hz and that a sense of texture was not perceived in a case where the frequency of the voltage signal is out of that range.

Further, the presence of the perception of a sense of texture for the absolute value of the difference between $f_1$ and $f_2$ was checked experimentally by applying a voltage signal of the frequency $f_1$ to all the X-electrodes 42 on the supporting substrate 41 and applying a voltage signal of the frequency $f_2$ on all the Y-electrodes 43. As a result, it was verified that a sense of texture was perceived in a case where the absolute value of the difference between $f_1$ and $f_2$ is larger than 10 Hz and less than 1000 Hz and that a sense of texture was not perceived in a case where the absolute value of the difference between $f_1$ and $f_2$ is 10 Hz or smaller or is 1000 Hz or larger.

Those results show that it is possible to achieve the tactual sense presenting unit 40 which presents a sense of texture to the region where the X-electrode to which the voltage signal of the frequency $f_1$ is applied and the Y-electrode to which the voltage signal of the frequency $f_2$ is applied intersects with each other and presents no sense of texture to other regions through setting $f_1$ and $f_2$ to be 500 Hz or larger and the absolute value of the difference between $f_1$ and $f_2$ becomes larger than 10 Hz and less than 1000 Hz provided that the frequency of the voltage signal applied to the X-electrodes is $f_1$ and the frequency of the voltage signal to be applied to the Y-electrodes is $f_2$.

Figure 6:
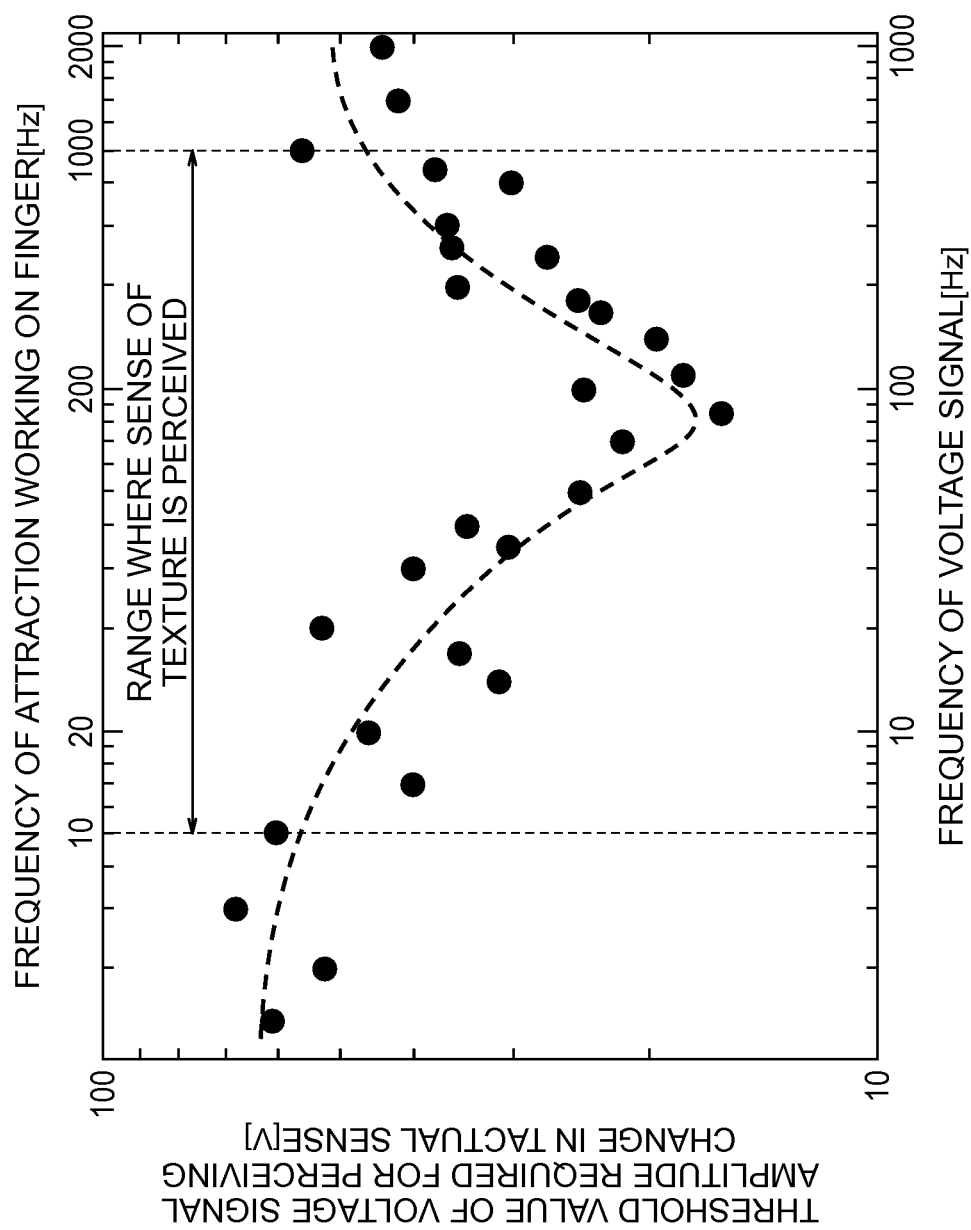
FIG. 6 is a graph of a measured relation regarding the threshold values of the amplifications of the voltage signals required for users to perceive a tactual sense with respect to the frequencies of attraction working on the finger with the tactual sense presenting unit shown in FIG. 3 and FIG. 4.

Further, the inventors, et al. of the present invention performed an experiment for checking the relation between the frequency of the attraction working on the finger and the perception of the tactual sense, since it is considered that the frequency of the attraction working on the finger affects the perception of a sense of texture from (Expression 3) and the facts depicted in the study thereof. FIG. 6 is a graph acquired by measuring the relation regarding the threshold value of the amplitude of the voltage signal required for the user to perceive the change in the tactual sense with respect to the frequency of the attraction working on the finger with the tactual sense presenting device 40 shown in FIGS. 3 and 4.

The graph of FIG. 6 shows the result acquired by measuring the threshold value of the amplitude required for perceiving the change in the tactual sense by applying the same voltage signal to all the X-electrodes 42 and all the Y-electrodes 43 on the supporting substrate 41 by changing the frequency. The lower axis shows the frequency of the voltage signal applied to all the X-electrodes 42 and all the Y-electrodes 43, and the left axis shows the threshold value of the amplitude of the voltage signal required for perceiving the change in the tactual sense.

In this experiment, the frequency of the attraction working on the finger of the operator is twice as large as the frequency $f_1$ of the applied voltage signal. In order to derive this relation, the static electric force F may be acquired by defining the resistance value of the resistance R49 shown in FIG. 5 as a finite value excluding infinity, i.e., extremely "0", and defining both of the frequencies of the voltage signals to be applied to the X-electrodes 42 and the Y-electrodes 43 as $f_1$. In FIG. 6, the frequency of the attraction working on the finger is shown on the upper axis. That is, the relation between the frequency of the attraction working on the finger and the threshold value of the amplitude required for the perception is expressed with the upper axis and the left axis of FIG. 6.

From the graph of FIG. 6, it can be found that the threshold value takes the minimum value when the frequency of the attraction working on the finger is near 200 Hz. That is, it is considered that the receptors of the skin of the human beings perceive a sense of texture with the highest sensitivity when the frequency of the attraction working on the finger is near 200 Hz. Further, from the graph of FIG. 6, it can be seen not only that the frequency of the attraction working on the finger is near 200 Hz in the bottom of the valley of the graph regarding the relation between the threshold value and the frequency but that the frequencies of the beginning and end of the valley of the graph are near 10 Hz and near 1000 Hz, respectively.

That is, a sense of texture is perceived when the frequency of the attraction is within a range of 10 to 1000 Hz. A sense of texture is not perceived with the frequency out of that range, and a sense of friction is perceived.

The above actions in the experiment can be described as follows. When the voltage signal of the frequency $f_1$ is applied to a prescribed X-electrode 42 on the supporting substrate 41 and the voltage signal of the frequency $f_2$ different from the frequency $f_1$ is applied to a prescribed Y-electrode 43, the attraction of the absolute value of the frequency $(f_1-f_2)$ works on the finger in the target region 47 which includes the intersection between the X-electrode 42 and the Y-electrode 43.

Thus, by setting the absolute value of the frequency $(f_1-f_2)$ to be larger than 10 Hz and less than 1000 Hz, a sense of texture can be presented in the target region 47 that is constituted by including the intersection between the prescribed X-electrode 42 and the prescribed Y-electrode 43.

The attraction of the frequency that is twice as large as the frequency $f_1$ works on the finger in the region on the X-electrode excluding the target region 47 constituted by including the intersection while the attraction of the frequency that is twice as large as the frequency $f_2$ works on the finger in the region on the Y-electrode excluding the target region 47 constituted by including the intersection based on the formula of the force working between the electrodes of the parallel plate capacitor.

Therefore, through setting both $f_1$ and $f_2$ to be 500 Hz or larger, the attraction of 1000 Hz or larger works on the finger both in the region of the prescribed X-electrode and in the region on the prescribed Y-electrode excluding the target region 47 constituted by including the intersection between the X-electrode 42 and the Y-electrode 43. Thus, a sense of texture is not presented. Therefore, defining the target region 47 as a first region and the other region as a second region, the tactual sense presenting unit can also be structured to be able to present different tactual senses simultaneously in the first region and the second region.

The existing tactual sense presenting device (Patent Document 1 described above) requires a space for drawing a plurality of independent wirings for each of the electrodes for presenting a sense of texture. As a result, the spaces between the electrodes for presenting a sense of texture become widened, so that the spatial resolution of the tactual sense presenting device becomes low. In this regards, the tactual sense presenting device 40 can increase the spatial resolution since the electrodes for presenting a sense of texture also function as the wirings.

Further, with this exemplary embodiment, the shapes of the electrodes are not easily recognized. Thus, even when it is used by being superimposed with the visual sense display unit 20, deterioration in the original display quality of the display device can be suppressed. Further, while the existing tactual sense presenting device faces such an issue that a sense of texture that is not required originally is presented in the regions where the wirings are drawn, the exemplary embodiment can overcome such issue.

In the example described above, there is only one target region 47. However, this example can be easily expanded to a case where there are a plurality of target regions. That is, the numbers of the electrodes to apply the voltage signal and the frequency thereof may be determined in such a manner that the absolute value of the difference between the frequencies of the voltage signals to be applied to each of the X-electrodes and the Y-electrodes become within a range of 10 to 1000 Hz (desirably near 200 Hz) in each of the target regions thereof and become out of that range in the regions other than the target regions.

As described above, the tactual sense presenting unit 40 can present a tactual sense different from that of the other regions in arbitrary regions on the tactual sense presenting surface on the X-electrode 42 and the Y-electrode 43. The position of the region or presence of the tactual senses to be presented can be controlled as desired by the voltage signals to be applied to the X-electrode 42 and the Y-electrode 43. Further, by changing the waveforms and the amplitudes of the voltage signals, various tactual senses can be presented.

The tactual sense presenting unit used in the first exemplary embodiment is constituted with the tactual sense presenting device exhibiting following characters. That is, the tactual sense presenting unit includes: a supporting substrate 41; a plurality of X-electrodes 42 that are provided in parallel to each other while being extended along the first direction on the supporting substrate; a plurality of Y-electrodes 43 that are provided in parallel to each other while being extended along the second direction on the supporting substrate and being insulated mutually with the X-electrodes; and the driving circuit which applies a voltage signal of a first frequency to the X-electrode corresponding to the target region 47 inputted from outside out of each of the X-electrodes and applies a voltage signal of a second frequency to the Y-electrode corresponding to the target region out of each of the Y-electrodes, wherein both the first and second frequencies are 500 Hz or larger and there is a period where the absolute value of the difference between the first and second frequencies is larger than 10 Hz and less than 1000 Hz.

First Exemplary Embodiment: Regarding Operation Content Acquiring Module

Figure 7:
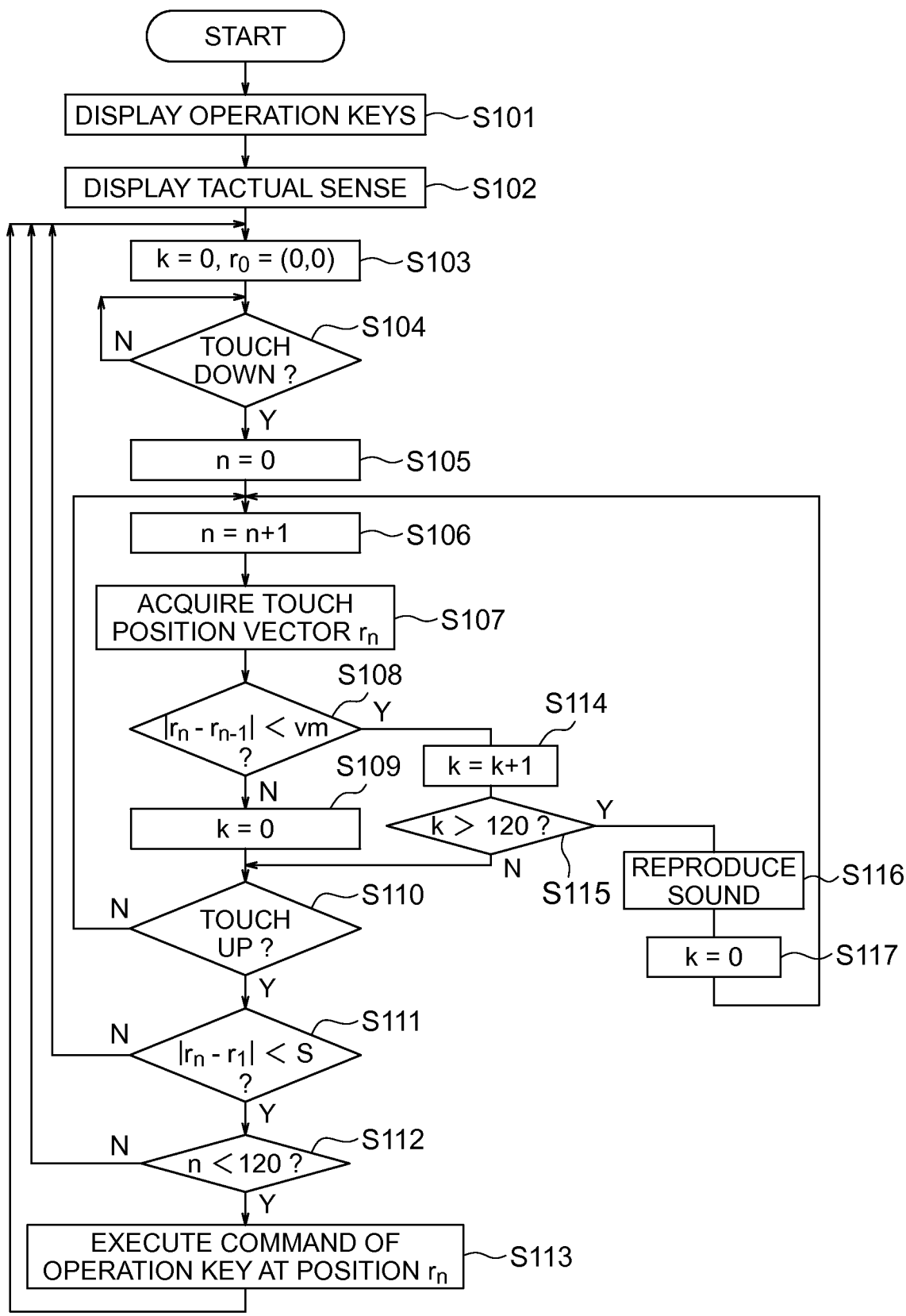
FIG. 7 is a flowchart showing actions done by the general control unit (especially an operation content acquiring module) of the electronic apparatus shown in FIG. 1 and FIG. 2.

FIG. 7 is a flowchart showing actions executed by the general control unit 10 (particularly the operation content acquiring module 14) of the electronic apparatus 100 shown in FIGS. 1 and 2. Regarding the operations described herein, an input operation to be detected by the operation content acquiring module 14 and a detection condition of that operation will be described first.

First, in the electronic apparatus 100, the range where the visual sense display unit 20 displays the operation screen, where the touch coordinate detection unit 30 accepts the operations done by the user, and also is the target of the tactual sense presenting unit 40 to present a tactual sense (a sense of texture) at the positions corresponding to the specific displayed objects 62a, 62b, etc. (operation buttons or the like) in the operation screen is referred to as an operation target range 61.

Further, to touch the operation target range 61 by the finger of the user is called "touch down". During touch down, coordinate input information is detected by the touch coordinate detection unit 30. Further, to release the finger of the user from the operation target range 61 is called "touch up".

An action of lightly pounding the operation target range 61 by the finger of the user is called "tap". An occurrence condition of a tap is that "touch up is done without a change in the touch position within one second after occurrence of touch down". Note here that it is judged that "there is no change in the touch position" when the change in the touch position at each of the points where touch down and touch up occur is smaller than a tap detection threshold value S in order to suppress the influence of the fluctuation in the touch position caused due to errors and the like of the operations done by human beings with their own fingers.

An action of continuously moving the finger of the user while touching the operation target range 61, i.e., an action of searching the displayed objects 62a, 62b, etc. where a tactual sense (a sense of texture) is presented by the processing of step S102 by groping, is called "search". A search continuing condition is that "the touch position is continuously changed without setting still for more than one second". Note here that it is judged to be "setting still" when move of the touch position in one cycle for performing position detection processing (typically $1/120$ second) is smaller than a set-still detection threshold value $V_m$ in order to suppress the influence of the fluctuation in the touch position caused due to errors and the like of the operations.

While the tap detection threshold value S is the threshold value for judging "change in the touch position in one second", the set-still detection threshold value $V_m$ is the threshold value for judging "change in the touch position in one cycle ($1/120$ second)". Needless to mention that the time conditions such as "one second", "$1/120$ second", and the like are design matters that can be changed as necessary.

An action of setting still the finger of the user at a specific position on the operation target range 61 for one second or longer is called "long press-down". An occurrence condition of long press-down is that "a state of touching a same position is continued for one second or longer". It is also judged whether or not the touch position is set still according to the same condition that is used for judging "search".

When the application execution module 11 is in a state of accepting input operations done by the user, the operation screen display control module 12 displays the operation screen in the state of accepting the input operations on the visual sense display unit 20 (the operation target range 61) (step S101). Further, by corresponding to that, the tactual sense presentation control module 13 controls the tactual sense presenting unit 40 to present a tactual sense (a sense of texture) to the positions corresponding to the specific displayed objects 62a, 62b, etc. in the operation target range 61 (step S102).

Further, the operation content acquiring module 14 performs initial setting as time parameter k=0 and touch position vector $r_0$=(0, 0) and stores those in the temporary storage module 16 (step S103) to be in a state of waiting for an occurrence of touch down within the operation target range 61 (step S104). Needless to mention, the initial value of $r_0$ is merely one of setting examples.

If no touch down occurs (No in step S104), the waiting state is continued. If touch down occurs (Yes in step S104), the operation content acquiring module 14 performs initial setting as time parameter n=0 (step S105), increments the value of n (increases the value by one) and stores it to the temporary storage module 16 (step S106), acquires the touch position vector $r_n$ that is the touch position at the value of the current time parameter n, and simultaneously stores it to the temporary storage module 16 (step S107).

Further, the operation content acquiring module 14 judges whether or not the distance between the touch position vector $r_n$ at the current time parameter (n) and the touch position vector $r_{n-1}$ at the parameter (n−1) that is one parameter before the current parameter stored in the temporary storage module 16 is smaller than the set-still detection threshold value $V_m$, i.e., whether or not $|r_n-r_{n-1}|<V_m$ is satisfied (step S108).

Typically, the position detection processing is performed with the frequency of 120 times per second. In other words, $r_{n-1}$ can be considered as the touch position at the time that is $1/120$ second before $r_n$ and $|r_n-r_{n-1}|$ can be considered as the moving speed of the touch position in $1/120$ second. To judge whether or not it is smaller than the set-still detection threshold value $V_m$ means to judge whether or not the touch position is set still without changing while taking fluctuation of the touch position caused by the errors and the like of the operations done by the human beings with their own fingers into consideration.

When judged as not being set still (No in step S108), the operation content acquiring module 14 resets to the time parameter k=0 and stores it to the temporary storage module 16 (step S109) to be in a state of waiting for the occurrence of touch up (step S110). If touch up does not occur (No in step S110), the processing from step S106 is repeated.

When touch up occurs (Yes in step S110), the operation content acquiring module 14 judges whether or not the distance between the touch position vector $r_n$ at the point of the occurrence of touch up and the touch position vector $r_1$ at the point of the occurrence of touch down stored in the temporary storage module 16 is smaller than the tap detection threshold value S, i.e., whether or not $|r_n-r_1|<S$ is satisfied (step S111). If Yes, the operation content acquiring module 14 subsequently judges whether or not the time parameter k<120 is satisfied (step S112). When either step S111 or step S112 is No, the processing is returned to step S103 to redo the processing by the operation content acquiring module 14 from the initial setting.

To judge whether or not the change in the touch position at each of the occurrence points of touch down and touch up is smaller than the tap detection threshold value S means to judge whether or not it is in a state where there is no change in the touch position from touch down to touch up while taking the fluctuation in the touch position caused due to the errors and the like of the operations as described above into consideration. Further, to judge whether or not the time parameter k<120 is satisfied means to judge whether or not the time from touch down to touch up is within one second since the position detection processing is done with the frequency of 120 times per second.

If steps S111 and S112 are both Yes, it means that "tap occurrence condition" which means to "perform touch up within one second after occurrence of touch down without having a change in the touch position" is satisfied. Thus, the operation content acquiring module 14 informs the application execution module 11 that there is a tap operation occurred at that coordinate position (step S113) and returns the processing to step S103.

If step S108 is Yes, i.e., if it is judged that touch is being continued in a set still state, the operation content acquiring module 14 increments the value of the time parameter k and stores it to the temporary storage module 16 (step S114), and judges whether or not k>120 is satisfied, i.e., judges whether or not touch is continued for one second or longer (step S115). If No, the processing is advanced to S110 to wait for an occurrence of touch up.

The state where step S115 is No, i.e., the state where the user is searching the part where a tactual sense (a sense of texture) is presented by the processing of step S102 while touching the operation target range 61, satisfies "search continuing condition" that is "to continuously change the touch position without having a still state of one second or longer". Thus, there is no reset of the time parameter k in this state.

If step S115 is Yes, "long press-down occurrence condition" which is "to continue the state of touching the same touch position for one second or longer" is satisfied. This, the operation content acquiring module 14 transmits the fact that the long press-down occurrence condition is satisfied and the touch coordinate thereof to the application execution module 11. The application execution module 11 gives an instruction to the sound output control module 15 to output the sound corresponding to the displayed object based on the touch coordinate (step S116), resets the time parameter k to 0 (step S117), and repeats the processing from S106. The sound output control module 15 upon receiving the instruction outputs the sound via the sound output unit 50. Thereafter, this action is repeated until the electronic apparatus 100 ends its operation.

First Exemplary Embodiment: Specific Operation Method

Figure 8A:
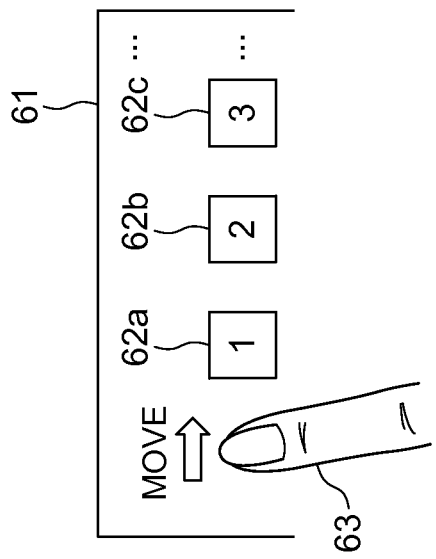
Figure 8B:
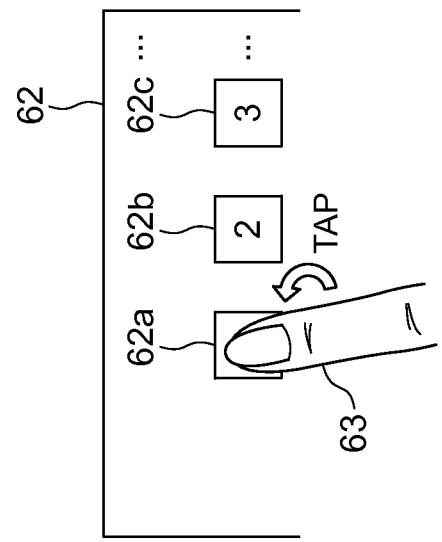
Figure 8C:
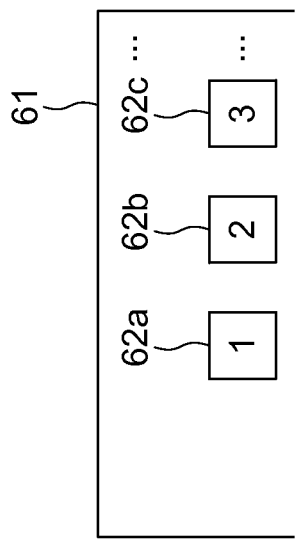
Figure 8D:
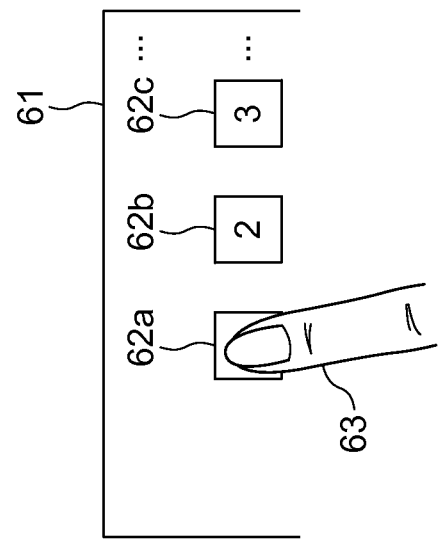

The operation method of the electronic apparatus 100 achieved by the actions described above will be described. FIGS. 8-8D are explanatory charts showing the operation method of the electronic apparatus 100 shown in FIGS. 1 and 2. FIG. 8A is a state where the operation screen display control module 12 displays the operation screen on the visual sense display unit 20 (the operation target range 61), FIG. 8B is a state where the user is placing the finger on the operation target range 61 and performing a search, FIG. 8C is a state where the user is performing long press-down at a specific position on the operation target range 61, and FIG. 8D is a state where the user is tapping the specific position on the operation target range 61, On the operation screen displayed on the visual sense display unit 20 (the operation target range 61) by the operation screen display control module 12, a plurality of displayed objects 62a, 62b, etc. are displayed. There may be a single displayed object or a plurality of displayed objects. Further, the items to be displayed, the layout thereof, the positional relations thereof, and the like can be determined arbitrarily. For example, numeric keys for inputting numerals of 0 to 9 may be used, alphabets, Japanese Katakana characters or the like may be inputted, or "OK" or "Cancel" may be inputted.

However, the positions where each of the displayed objects 62a, 62b, etc. is displayed are the positions where the touch coordinate detection unit 30 accepts the input operation corresponding to the display item at the same time and also are the positions where the tactual sense presenting unit 40 presents a tactual sense (a sense of texture). In the example shown in FIG. 8A, numeric keys are displayed as the displayed objects 62a, 62b, etc. The example shown in FIG. 8B is a state where the user is searching the displayed objects 62a, 62b, etc. where a tactual sense (a sense of texture) is presented by groping while moving the finger 63 that is touching the operation target range 61. The user at this time can search the whereabouts of the displayed objects 62a, 62b, etc. by a tactual sense. However, it is not possible to find out which displayed object corresponds to which input content (character or the like).

Thus, as shown in FIG. 8C, the user stops moving the finger 63 at the position where one of the displayed objects 62a, 62b, etc. is found and sets it still at the same touch position for one second or longer. Upon that, "long press-down" shown in steps S115 to 117 in FIG. 7 is detected, and the sound output control module 15 outputs the sound of the content corresponding to the displayed object. When it corresponds to the key for outputting "1" out of the numeric keys, the sound of "one" is outputted from the sound output unit 50.

Then, if the outputted sound is the sound intended by the user, the user lightly pounds that position, i.e., executes a "tap" operation, as shown in FIG. 8D. Upon that, the content which is in this case is the operation content of inputting "1" is given to the software that is operated by the application execution module 11. If "1" is not the content intended by the user, the user continues to move the finger shown in FIG. 8B, i.e., continues the search.

As shown in the above, the electronic apparatus according to the first exemplary embodiment is so controlled that the operation content acquiring module 14 executes a prescribed function (an operation of inputting "1" to the operating software in this example) corresponded to the displayed object via the application execution module 11 when detecting the action of tapping the operation screen at the position corresponding to the displayed object.

In the above, described is the example where the sound of "one" is outputted when long press-down of the displayed object of the button on which the numeral "1" is written is done. However, the sounds to be outputted are not limited to the sounds that are imitations of the sounds generated by human beings through vocal organs. For example, patterns constituted with generation and termination of sounds such as "- - - -" of the Morse codes may be outputted. Alternatively, when functions of the buttons of the displayed objects are allotted to reproduce specific pieces of music, a part of or the entire part of such music may be outputted as the sound.

Further, in the above, also described is the example where the sound of "one" is outputted when long press-down on the displayed object of the button on which the numeral "1" is written is done. However, the information to be outputted is not limited only to the sounds but information stimulating various sensory organs (sense stimulus information), i.e., information stimulating the auditory sense, the tactual sense, the gustatory sense, the visual sense, and the olfactory sense, can be used. For example, in a case where the visual impairment of the user is in the degree with which characters cannot be read but light and darkness can be recognized, the user can understand the meanings of the displayed objects through controlling the light and darkness on the screen according to the Morse codes.

Alternatively, the user can also understand the meanings of the displayed objects by performing oscillation according to the Morse codes. Also, the user can understand the meanings of the displayed objects through providing a gustatory sense presenting module and presenting the gustatory sense corresponding to the displayed objects. Furthermore, the user can also understand the meanings of the displayed objects through providing an olfactory sense presenting module and presenting the smell corresponding to the displayed objects.

Considering that, the electronic apparatus of the present invention can be expressed as follows.

That is, it is an electronic apparatus which includes: a visual sense display unit which displays an operation screen including an operation target range for a user; a touch coordinate detection unit which detects a content of a touch operation done by the user on a displayed object that is displayed within the operation target range; and a tactual sense presenting unit which presents a tactual sense that can be perceived by the user on the operation screen, and the electronic apparatus includes: a tactual sense presentation control module which presents a tactual sense corresponding to the displayed object to the user on the operation screen via the tactual sense presenting unit; an operation content acquiring module which detects whether or not a temporal change in a touch position detected on the displayed object by the touch coordinate detection unit is equal to or less than a preset threshold value and whether or not such state continues for a preset time or longer; and a sense stimulus information output control module which outputs sense stimulus information corresponding to the displayed object to outside via a sense stimulus information output unit provided in advance, when the state continues for the preset time set or longer.

Entire Actions and Effects of First Exemplary Embodiment

Next, the entire actions of the first exemplary embodiment will be described. The operation control method of the electronic apparatus according to the exemplary embodiment is a method for controlling the electronic apparatus 100 which includes the visual sense display unit 20 which displays the operation screen including the operation target range 61 for the user, wherein: the operation screen display control module 12 creates the operation screen that is a content acquired when the application execution module 11 executes processing, and displays the operation screen on the visual sense display unit 20 (FIG. 7: step S101); the tactual sense presentation control module 13 presents a tactual sense corresponding to the operation screen that can be perceived by the user within the operation target range 61 on the operation screen via the tactual sense presenting unit 40 (FIG. 7: step S102); the touch coordinate detection unit 30 detects a content of a touch operation done by the user on the displayed objects 62a, 62b, etc. displayed within the operation target range 61 (FIG. 7: step S107); the operation content acquiring module 14 detects whether or not a temporal change in a touch position detected on the displayed object is equal to or less than a preset threshold value and such state continues for a preset time or longer (FIG. 7: steps S108, 115); and the sense stimulus information output control module (sound output control module 15) outputs sense stimulus information corresponding to the displayed object to outside via the sense stimulus information output unit (sound output unit 50) provided in advance when the state continues for the present time or longer (FIG. 7: step S116). The sense stimulus information can be structured as the sounds.

Note here that the step of presenting a tactual sense by the tactual sense presenting unit 40 is the step where the tactual sense presenting unit 40 presents a tactual sense that can be perceived by the user at the positions corresponding to the displayed objects 62a, 62b, etc. on the operation screen (FIG. 7: step S102). Further, the operation content acquiring module 14 detects whether or not there is an action of taping the operation screen at the positions corresponding to the displayed objects 62a, 62b, etc. (FIG. 7: steps S110 to 112). When such action is detected, the operation content acquiring module 14 gives an instruction to the application execution module 11 to execute the operation content corresponding to the displayed object (FIG. 7: step S113).

Note here that each of the action steps may be put into a program to be executed by computers to have those executed by a processor which is provided to the general control unit 10 which directly executes each of the steps. The program may be recorded in a non-transitory recording medium such as a DVD, a CD, a flash memory, or the like. In that case, the program is read out from the recording medium and executed by the computers.

With such actions, the exemplary embodiment can provide following effects.

As described above, through employing the tactual sense presenting device shown in the related technique to the electronic apparatus, the user can find the whereabouts of the displayed objects as the target of tap input without relying on the visual sense. However, in order to perform operations in practice without relying on the visual sense, it is required to memorize the layout of the displayed objects and the operation contents corresponding thereto in advance. As a measure for making it possible for those with impaired vision to use the electronic apparatus easily, it is still insufficient.

With the exemplary embodiment, when the user finds out the whereabouts of the displayed object where the tactual sense is presented without using the touch information at the positions corresponding to the operation key, the operation content corresponding to the displayed object is read out with a sound. This makes it possible for the user who does not memorize the layout of each of the displayed objects and the operation contents thereof to easily operate the electronic apparatus without relying on the visual sense. Further, even in a case where the user touches the operation target range with a plurality of fingers simultaneously, operations can be done in the same manner as that of the example. In this respect, the operability can also be improved.

Common Effects of First Exemplary Embodiment and Second Exemplary Embodiment Described Later Further, the present invention is structured to output the sound corresponding to the displayed object in a case where the temporal change at the touch position is equal to or less than the threshold value continues. Thus, when the user having no visual impairment performs an operation such as a tap on the displayed object, the sound is not outputted. Therefore, those who are not visually impaired can perform input operations in a state where originally unwanted sounds are not outputted, so that such users can utilize the apparatus comfortably.

As described, the present invention can provide the electronic apparatus, the electronic apparatus operation control method, and the program thereof, which can be utilized easily or comfortably by both of the users with and without visual impairment without requiring a change and the like of the apparatus settings between a case where the users with visual impairment use them and a case where the users without visual impairment use them.

Effects Peculiar to First Exemplary Embodiment

Further, the exemplary embodiment is structured to present a sense of texture at the position of the displayed object in a localized manner based on the information of the position of the displayed object, so that one of the problems of the related techniques, which is a position shift caused by a time lag, can be overcome. For example, in Patent Document 4 described above, described is the technique which outputs the sound and oscillates the panel "according to the content of the input operation". This is the technique which judges the input operation done via the touch panel, and oscillates the panel according to the result thereof. That is, there is generated a shift between the position of the operation key and the position where the tactual sense is generated due to a time lag caused by the judgment.

In the meantime, the exemplary embodiment does not require the information of the input operation done via the touch panel for presenting the tactual sense. The tactual sense presenting unit of the first exemplary embodiment is structured to be capable of presenting different tactual senses simultaneously in the first region and the second region on the operation screen. Thus, through providing the tactual sense presentation control module which drives the tactual sense presenting unit to present the tactual sense that can be perceived by the user at the position of the displayed objects at the point before the user performs a touch operation on the displayed object, it becomes possible to present in advance the tactual sense that is different from the others at the position of the displayed object. Thus, the position shift is not generated. Therefore, even in a case where the user performs a search quickly, the position of the displayed object and the position of a sense of texture are consistent at all times, so that the operability is improved remarkably.

Additional Effects of First Exemplary Embodiment

The shift generated between the position of the displayed object and the position where the tactual sense is generated is the issue found through the thought and experiments done by the inventors of the present invention. It will be described in details.

Figure 9:
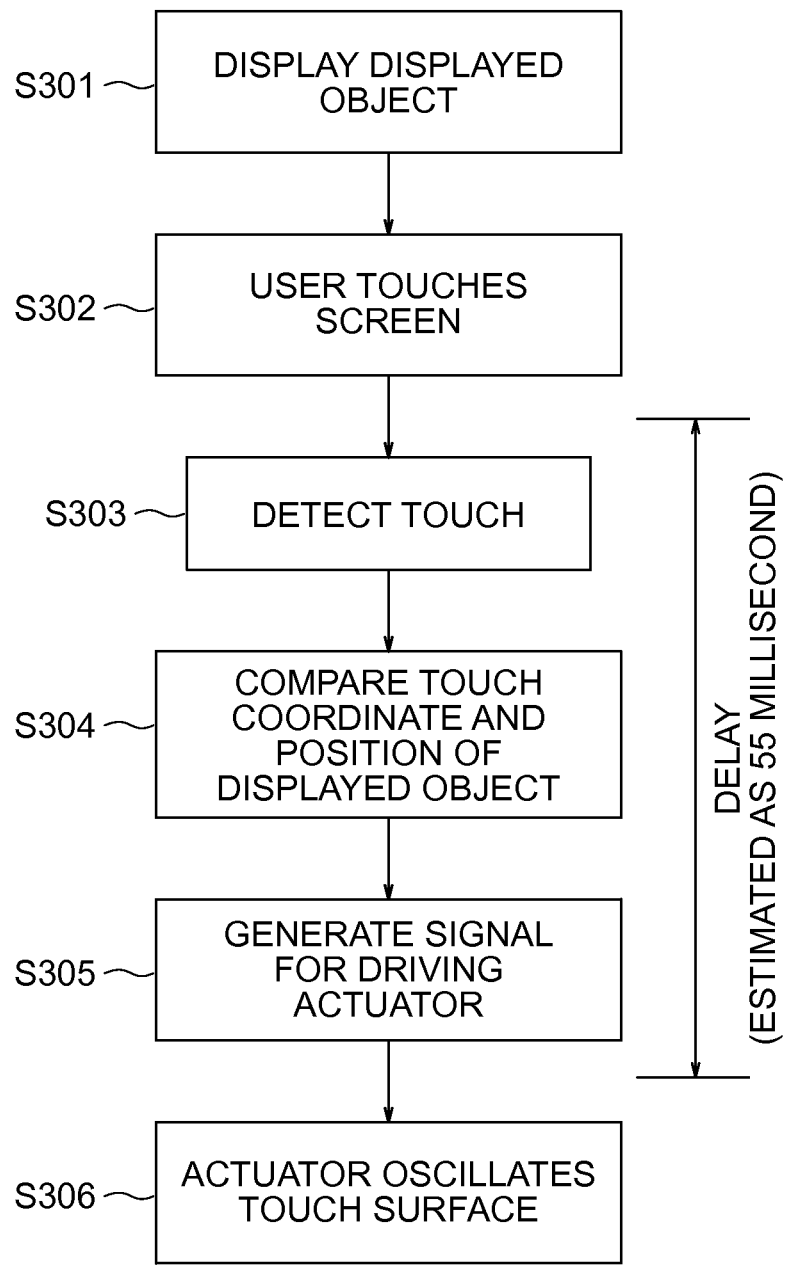
FIG. 9 is a flowchart showing operations of an electronic apparatus according to a related technique.

FIG. 9 is a flowchart created by the inventors of the present invention based on the depiction of Patent Document 3. This flowchart shows the process of "displaying the transaction selection screen on the display unit and oscillating the touch panel by the oscillation generating unit when the position of the finger of the customer touching the panel enters the area of the keys displayed on the display unit" which is depicted in Patent Document 3. This process goes through following steps in order.

The transaction selection screen including the displayed objects corresponding to the operation keys (keys) is displayed on the visual sense display unit (the display unit) (S301).

The user (customer) touches the screen (the touch panel surface) by a finger (S302).

The touch coordinate detection unit detects the touch and detects the touch coordinate thereof (S303).

The touch coordinate and the position (area) of the displayed object are compared (S304).

If the touch coordinate is within the range of the area of the displayed object, a signal for driving the actuator (the oscillation generating unit) is generated (S305).

The actuator oscillates the touch panel surface (S306).

For going through the above-described steps in order, a prescribed time passes from the point where the finger of the user enters in the range of the displayed object to the point where the touch surface is oscillated when the user finds the operation key by searching. This time is called "delay" or "time lag". The time lag (i.e., the time from the point where the processing of step S302 is ended until the point where the touch surface actually starts to oscillate in step S306 after going through the processing of steps S303 to S305) is estimated as 55 milliseconds or longer by taking the response time of current smartphones as a reference.

In the meantime, when the user searches the position of the operation key, it was found by the experiments done by the inventors, et al. of the present invention that the speed of the finger of the user exceeds 700 mm/sec. The product of the time lag and the speed of the finger is 38.5 mm, and this shows the shift between the position of the displayed object and the position where the finger is at when the tactual sense is generated.

Figure 10B:
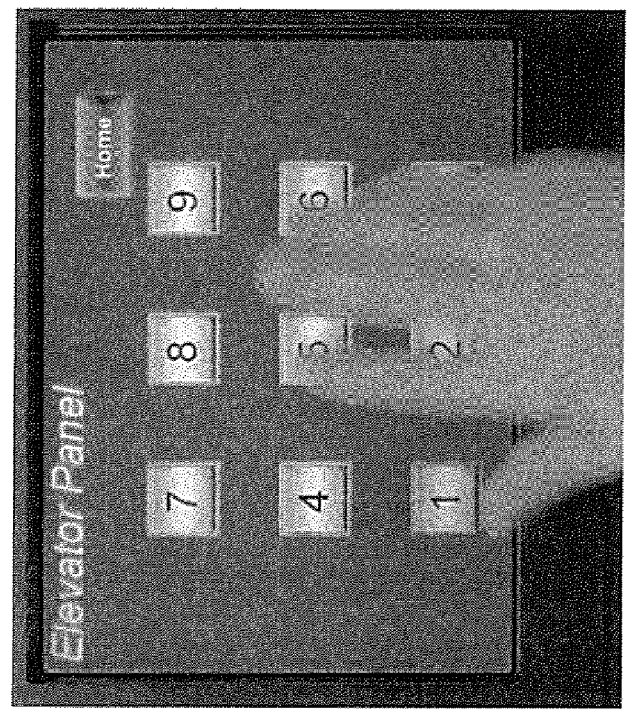
Figure 10A:
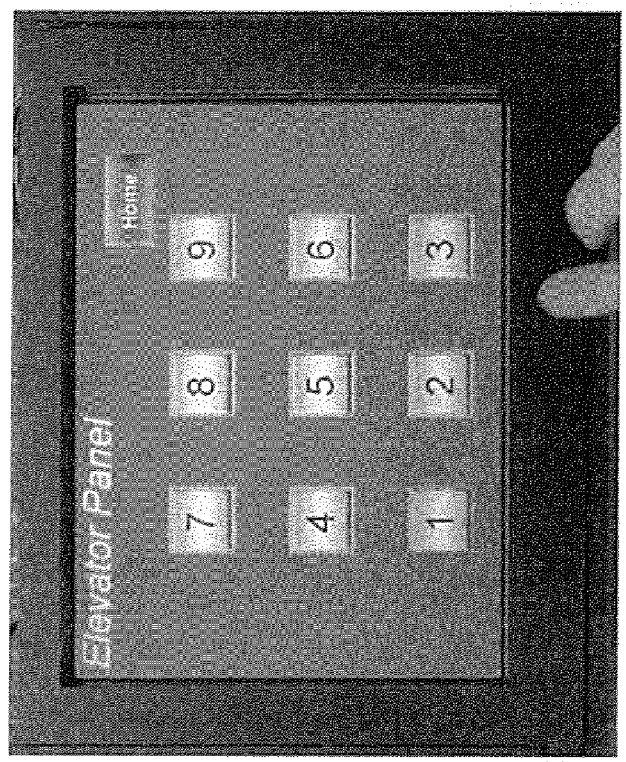

The measurement of the speed of the finger of the user will be described by referring to FIG. 10 and FIG. 11. FIG. 10 shows the electronic apparatus of the first exemplary embodiment which is provided with the visual sense display unit and the tactual sense presenting unit of 10.4 inches diagonally. Nine square-shaped buttons in a form of three rows by three columns were displayed in the electronic apparatus. The tactual sense was presented at the positions of those displayed objects by using the tactual sense presenting unit. This state is shown in FIG. 10A as a state where the user is not searching.

A task of searching the position of the button by the tactual sense is given to the user by using the electronic apparatus. The move of the finger at that time was captured as a film and the speed of the finger was acquired. The picture captured during the task is shown in FIG. 10B as a state where the user is searching.

Figure 11:
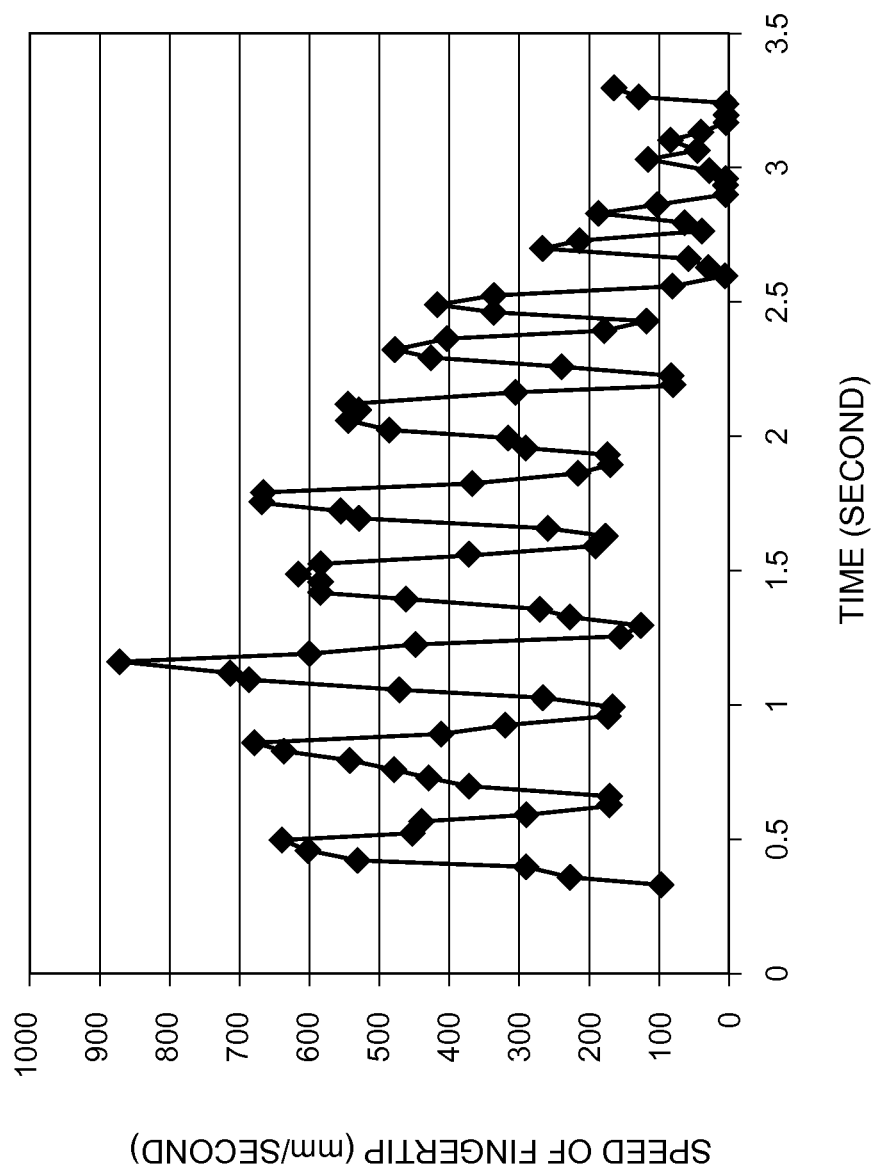
FIG. 11 is a graph showing the result acquired by measuring temporal changes of the speed of the fingertip.

FIG. 11 is a chart showing the temporal change in the measured speed of the finger. The measured maximum speed of the fingertip exceeds 700 mm/sec. The user scanned and searched the left and right directions of the screen by the finger and moved the scanning positions of the left and right directions gradually in the top and bottom directions of the screen. The speed of the fingertip took the minimum value when the fingertip of the user reached the left and right ends of the screen, and the speed of the fingertip took the maximum value when the finger of the user was in the vicinity of the center of the screen.

Based on those results, the shift between the position of the displayed object and the position where the finger is at when the tactual sense is generated is visualized as in FIG. 12. FIG. 12A relatively shows the position of a displayed object 621 and the position where the finger is at when the tactual sense is generated in a case where the finger is moved in the right direction (a moving direction 631) in the electronic apparatus which goes through steps S301 to S306 in order written by the inventors of the present invention based on the related techniques. The position of the displayed object 621 perceived by the visual sense is shown with a label of "visual sense". As an example of the screen, in a case where the displayed object 621 is shown with a black rectangle and the background is shown with white, the lateral axis of the pulse waveform shown with the label of the visual sense corresponds to the position and the longitudinal axis corresponds to the luminance of the displayed object 621. Further, the position perceived by the tactual sense is shown with a label of "tactual sense". The lateral axis of the pulse waveform shown with the label of the tactual sense corresponds to the position and the longitudinal axis corresponds to the intensity of the perceived oscillation. Note that the displayed object 621 of this example is a button used for tap input.

As can be seen from FIG. 12A, the position where the finger is at when the tactual sense is generated is shifted on the right side by 38.5 mm with respect to the visual sense that is the position where the displayed object 621 is at. In a case where the size of the displayed object 621 in the left and right directions as the target of tap input is smaller than 38.5 mm, there is no product of graphic calculation between the both in the relation between the position of the button of the tap input perceived by the tactual sense and the position of the displayed object 621. Thus, even when the position of the button perceived by the tactual sense is tapped, the function of the button is not executed.

FIG. 12B relatively shows the position of a displayed object 622 and the position where the finger is at when the tactual sense is generated in a case where the finger is moved in the right direction (moving direction 631) and the left direction (moving direction 632). The positon where the tactual sense is perceived by the finger when searched in the right direction is shown with a label of "tactual sense (1)". When the tactual sense is perceived in the chart, the intensity of the oscillation on the longitudinal axis becomes larger. When the tactual sense is not perceived, the intensity of the oscillation becomes smaller. Thus, when the finger is moved in the right direction for searching, there is shown a pulse-like change with respect to the position. Similarly, the position where the tactual sense is perceived when searched in the left direction is shown with a label of "tactual sense (2)".

As can be seen from FIG. 12B, in a case where the finger is moved in the right direction for searching, the position where the finger is at when the tactual sense is generated is shifted on the right side by 38.5 mm with respect to the visual sense. In the meantime, in a case where the finger is moved in the left direction for searching, the position where the finger is at when the tactual sense is generated is shifted on the left side by 38.5 mm with respect to the visual sense. In a case where the size of the displayed object 622 in the left and right directions as the target of tap input is smaller than 77.0 mm, there is no product of graphic calculation between the both in the relation between the position of the button of the tap input perceived by searching in the right direction and the position of the button of the tap input perceived by searching in the left direction. That is, the difference between the position of the button of the tap input perceived by searching in the right direction and the position of the button of the tap input perceived by searching in the left direction becomes great. Thus, the user becomes confused, thereby causing a hindrance in tap input.

As described, when display of the displayed objects and presentation of the tactual sense are done by using the related technique as in Patent Document 3, there is a time lag (delay) between display and presentation of the tactual sense. Thus, as described above, when searching the tactual sense presenting position, there is a large shift generated between the displayed position and the position where oscillation is actually generated and the tactual sense is perceived. This position shift greatly deteriorates the usability.

Figure 13:
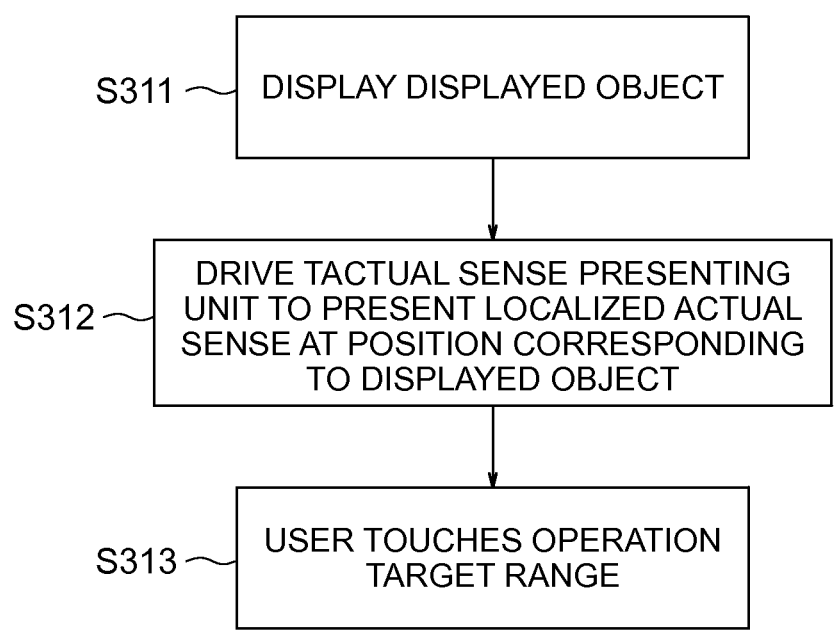
FIG. 13 is a flowchart showing actions of the electronic apparatus according to the first exemplary embodiment.

In the meantime, a flowchart of the electronic apparatus according to the exemplary embodiment is shown in FIG. 13. The electronic apparatus of the exemplary embodiment includes the structures and actions described by using FIG. 1 to FIG. 8, and includes a process that goes through following steps.

The displayed object corresponding to the operation key is displayed on the tactual sense display unit 20 (S311).

The tactual sense presenting panel (the tactual sense presenting unit 40) is driven to present the localized tactual sense (a sense of texture) at the position corresponding to the displayed object (S312).

The user touches the operation target range 61 (S313).

The electronic apparatus 100 according to the exemplary embodiment includes the tactual sense presenting unit 40 that is capable of presenting different tactual senses on the surface simultaneously. Thus, as shown in the above-described flowchart, the tactual sense presenting unit 40 can be driven at a point before the user touches the operation target range 61. As a result, the position shift caused due to a time lag as one of the issues of the related techniques can be overcome.

FIG. 14 shows charts for describing the shift between the position of the displayed object and the position of the tactual sense in the electronic apparatus 100 of the exemplary embodiment which goes through the above-described steps S311 to S313 in order. FIG. 14A shows the position of the displayed object 621 and the position where the tactual sense is generated in a case where the finger is moved in the right direction (moving direction 631). FIG. 14B shows the position of the displayed object 621 and the position where the tactual sense is generated in a case where the finger is moved in the right direction (moving direction 631) and the left direction (moving direction 632). As in the case of FIG. 12, the position of the displayed object 621 perceived by the visual sense is also shown with a label of "visual sense" in FIG. 14. The lateral axis corresponds to the position and the longitudinal axis corresponds to the luminance of the displayed object 621. Further, the position perceived by the tactual sense is shown with a label of "tactual sense". The lateral axis corresponds to the position and the longitudinal axis corresponds to the intensity of the perceived sense of texture. In the exemplary embodiment, a localized sense of texture is presented at the position of the displayed object. Thus, there is shown a pulse-like change with respect to the position.

As described above, the tactual sense presenting unit 40 of the exemplary embodiment is structured to be capable of presenting different tactual senses simultaneously in the first region and the second region on the operation screen. Thus, through providing the tactual sense presenting unit 40 and the tactual sense presentation control module 13 which drives the tactual sense presenting unit to present the tactual sense that can be perceived by the user at the position of the displayed objects at a point before the user performs a touch operation on the displayed object, it becomes possible to present in advance the tactual sense that is different from the others at the position of the displayed object. Thus, the position shift is not generated.

As can be seen from those charts, there is no position shift between the position of the displayed object and the position where the tactual sense is generated in the electronic apparatus 100 of the exemplary embodiment. The reason thereof is that the region of the displayed object of the tactual sense presenting unit 40 is driven at the point before the user touches the operation target range 61 or that a comparison action between the touch position and the position of the displayed object is unnecessary. Thus, even in a case where the user performs a search quickly, the position of the displayed object and the position where the tactual sense is generated are consistent. Therefore, the operability is improved remarkably.

With the actions of the exemplary embodiment described above, all the contents of the operations done by the user to the apparatus are outputted via the sound output unit. For example, in a case where it is desirable to prevent the operation content from being heard by others such as when inputting a personal identification number at an ATM of a bank, it is possible to prevent the sound output from being heard by others through utilizing an earphone or the like.

From another viewpoint, the electronic apparatus of the present invention can be expressed as an electronic apparatus having following features. That is, the electronic apparatus of the present invention includes:

a tactual sense presenting unit capable of changing a tactual sense in a part of the regions of the surface, i.e., the tactual sense presenting unit capable of presenting different tactual senses on the surface;

a touch detection unit which detects a contact of the user for the tactual sense presenting unit;

a tactual sense object presented by changing the tactual sense in a prescribed region of the tactual sense presenting unit; and a tactual sense presentation control module which drives the tactual sense presenting unit to present the tactual sense object at a point before the user touches the tactual sense object, wherein an action corresponding to the tactual sense object is executed when a prescribed touch action on the tactual sense object is detected.

As described, it is possible to omit the visual sense display unit in the present invention. In that case, the "displayed object" is replaced with the "tactual sense object".

Second Exemplary Embodiment

Instead of the structures of the first exemplary embodiment described above, an electronic apparatus 200 according to a second exemplary embodiment of the present invention is so structured that a general control unit 210 includes an oscillation presentation control module 213 which controls the operation of an oscillation presenting unit 240 that is provided in advance instead of the tactual sense presenting unit so as to directly oscillates the entire operation target range 61 when an operation content acquiring module 214 detects the touch positions on the displayed objects 62a, 62b, etc.

With such structure, the same effects as the case of the first exemplary embodiment can be acquired at a still lower cost. Further, the effects can be acquired, only by adding and replacing software with the existing apparatus.

Hereinafter, this will be described in more details.

Figure 15:
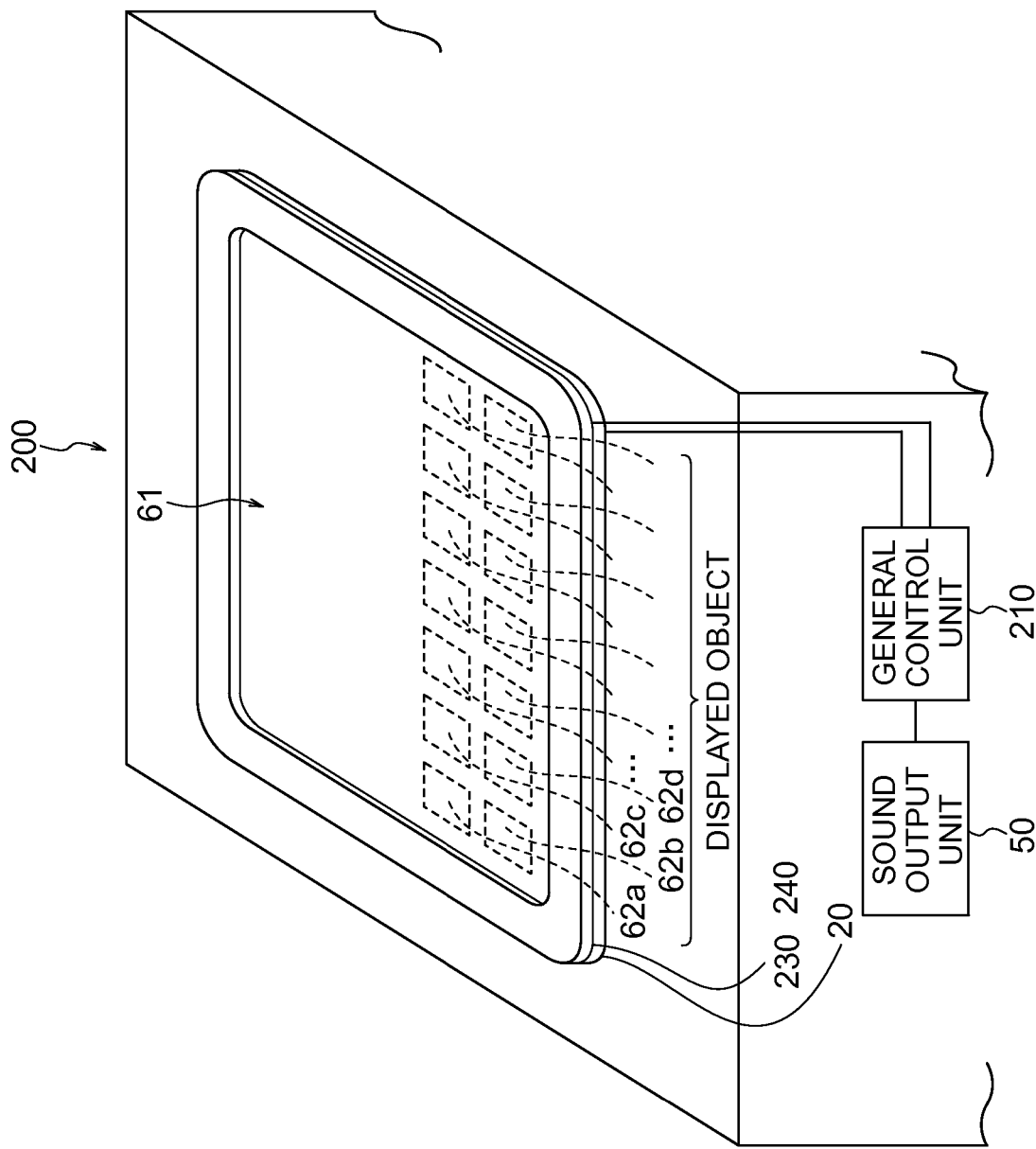
FIG. 15 is an explanatory chart showing structures of an electronic apparatus according to a second exemplary embodiment.

FIG. 15 is an explanatory chart showing the structures of the electronic apparatus 200 according to the second exemplary embodiment of the present invention. The electronic apparatus 200 includes many structures and contents that are in common to the electronic apparatus 100 according to the first exemplary embodiment described above, so that same names and reference numerals as those of the first exemplary embodiment are applied to those that are in common. The electronic apparatus 200 includes: a visual sense display unit 20 that is in common to the first exemplary embodiment; the oscillation presenting unit 240 that is different from the case of the first exemplary embodiment; the touch coordinate detection unit 230 that is different from the case of the first exemplary embodiment; and the general control unit 210 that is different from the case of the first exemplary embodiment.

The touch coordinate detection unit 230 is typically a touch panel provided on the surface of the visual sense display unit 20 that is a liquid crystal display. Through attaching a mechanical oscillator in the periphery of the touch panel, a function of presenting oscillation is given to the touch panel. Thus, in the electronic apparatus 200, the touch panel also functions as the tactual sense presenting unit.

The tactual sense presenting unit 40 according to the first exemplary embodiment presents a tactual sense (a sense of texture) at the positions corresponding to each of the specific displayed objects 62a, 62b, etc. within the operation target range 61. In the meantime, the oscillation presenting unit 240 directly oscillates the entire operation target range 61, i.e., the entire surface touched by the user for operation, to present a tactual sense to the user. Specifically, it can be achieved by utilizing a piezo oscillator, a small motor used in a mobile phone terminal vibrator, or the like.

Figure 16:
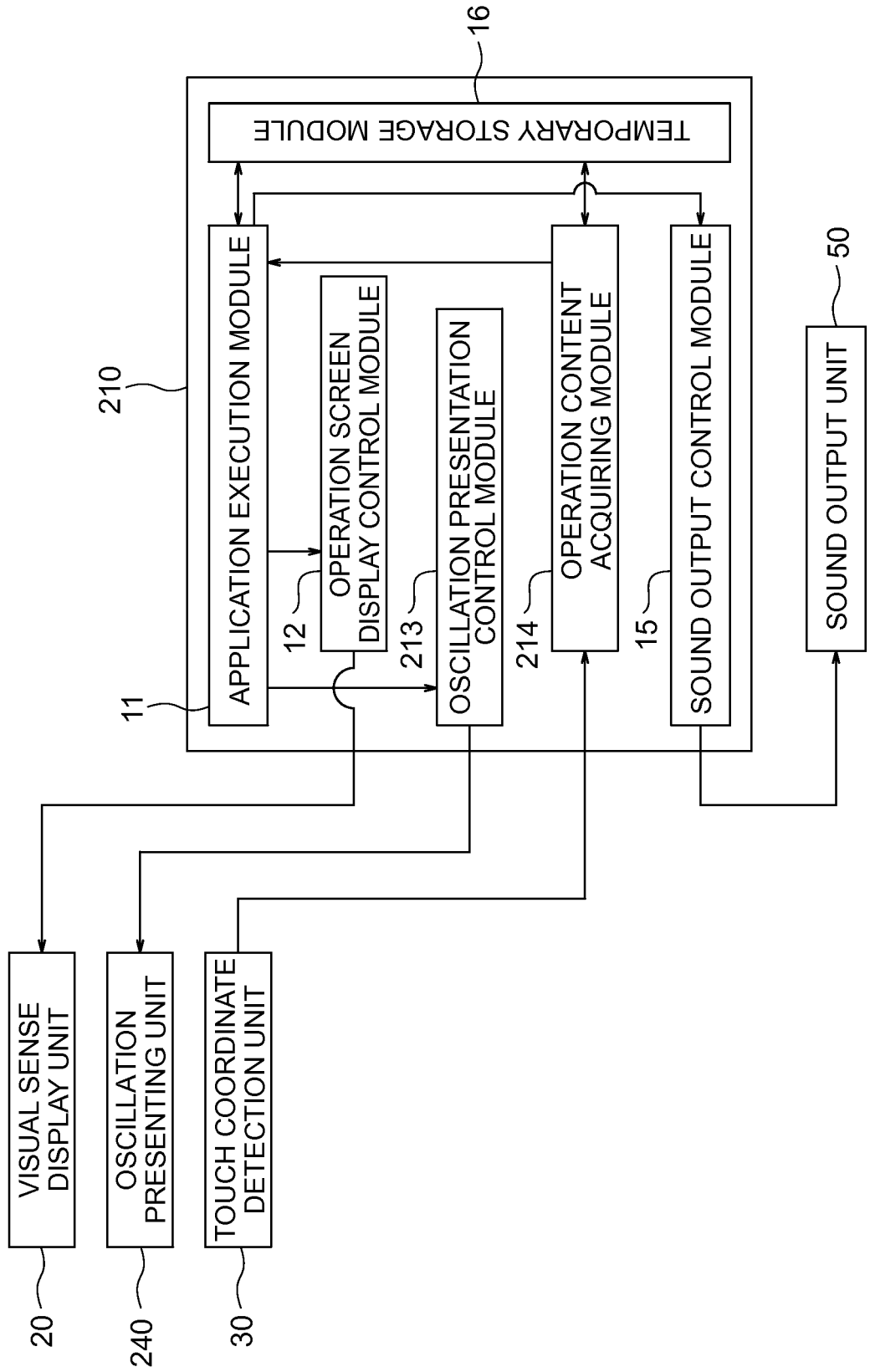
FIG. 16 is an explanatory chart which conceptually shows more detailed structures of a general control unit of the electronic apparatus shown in FIG. 15.

FIG. 16 is an explanatory chart which conceptually shows the more detailed structures of the general control unit 210 of the electronic apparatus 200 shown in FIG. 15. The general control unit 210 functions as each of the application execution module 11, the operation screen display control module 12, the tactual sense presentation control module 13, the operation content acquiring module 14, and the sound output control module 15 by executions of the operation control program. Those modules are in common to the first exemplary embodiment except for the oscillation presentation control module 213 and the operation content acquiring module 214. Further, the general control unit 210 is also provided with a sound output unit 50 and a temporary storage module 16 which are in common to the first exemplary embodiment.

The oscillation presentation control module 213 presents oscillation to the user by oscillating the entire operation target range 61 through controlling the oscillation presenting unit 240 according to an action instruction from the application execution module 11.

Figure 17:
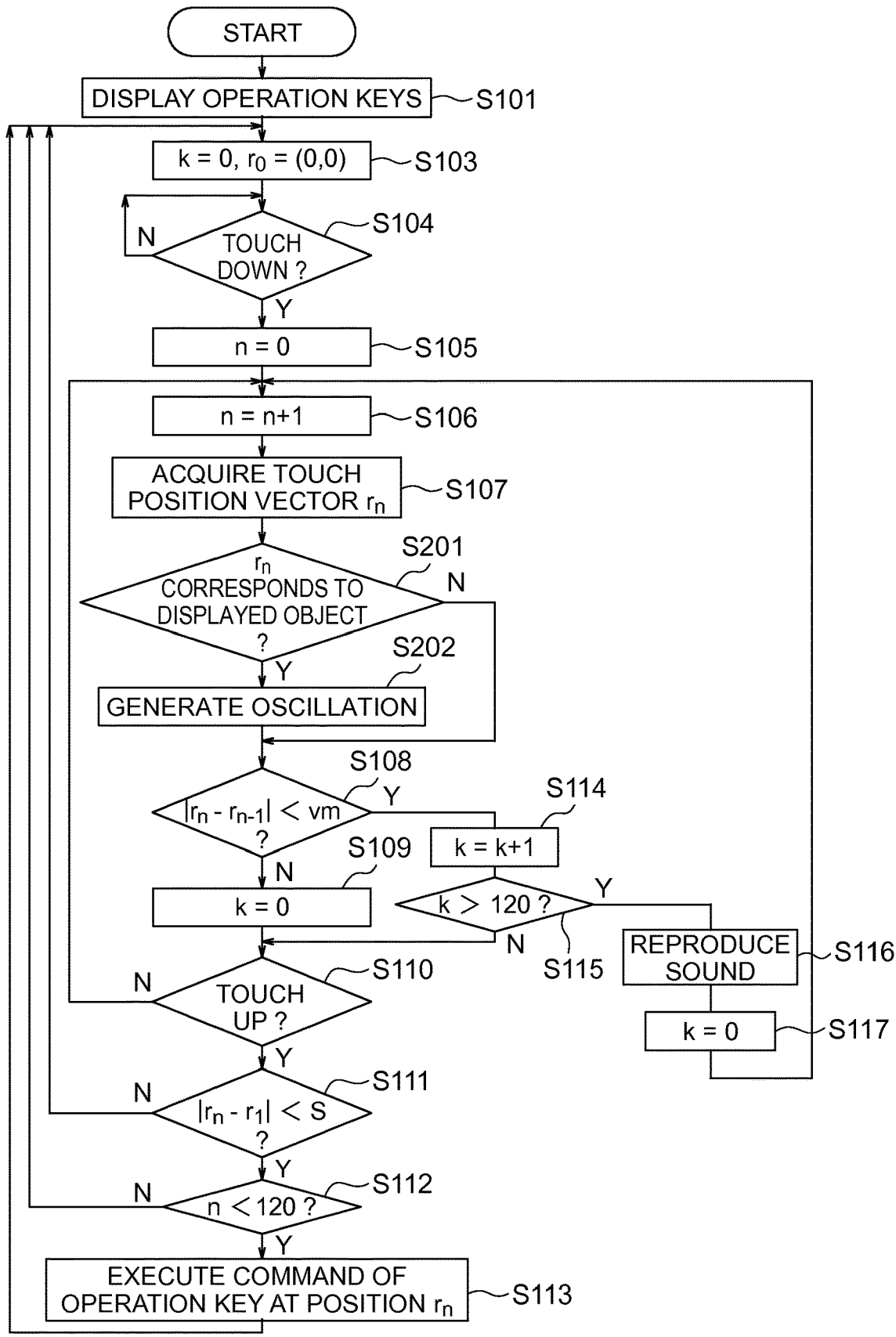
FIG. 17 is a flowchart showing actions done by the general control unit (especially an operation content acquiring module) of the electronic apparatus shown in FIG. 15 and FIG. 16.

FIG. 17 is a flowchart showing actions done by the general control unit 210 (especially the operation content acquiring module 214) of the electronic apparatus 200 shown in FIGS. 15 and 16. FIG. 17 also includes many actions that are in common to the first exemplary embodiment shown in FIG. 1, so that same reference numerals are applied to the common actions. Definitions of each of the actions of "touch down", "touch up", "long press-down", "search", and "tap" and detection conditions of each of those are also the same as those of the first exemplary embodiment.

When the application execution module 11 comes to be in a state for accepting input operations by the user, the operation content acquiring module 214 executes same actions as those of step S101 to step S104 shown in FIG. 7 by omitting step S102.

When a touch down occurs (Yes in step S104), the operation content acquiring module 214 executes same actions of S105 to S107 shown in FIG. 7. The operation content acquiring module 214 transmits the information indicating that a touch down occurred and the touch down vector $r_n$ acquired in step S107 to the application execution module. The application execution module 214 judges whether or not the coordinate of the touch position vector $r_n$ acquired in step S107 is the position corresponding to the displayed objects 62a, 62b, etc. (step S201).

When the coordinate of $r_n$ corresponds to the displayed object (Yes in step S201), the application execution module 11 gives an instruction to the oscillation presentation control module 213 to generate oscillation (step S202) and proceeds to the processing of step S108 and thereafter. The oscillation presentation control module 213 upon receiving the instruction oscillates the entire operation target range 61 via the oscillation presenting unit 240.

When the coordinate of $r_n$ does not correspond to the displayed object (No in step S201), the application execution module 11 simply proceeds to the processing of step S108 and thereafter. The processing of step S108 and thereafter is the same actions as the case of the first exemplary embodiment described in FIG. 7.

With the electronic apparatus 200 according to the exemplary embodiment described above, the same effects as those of the electronic apparatus 100 according to the first exemplary embodiment can be acquired even with an apparatus that is not provided with the tactual sense presenting unit for presenting a tactual sense (a sense of texture) at the positions corresponding to the positions of each of the displayed objects. That is, it is simply required to provide a piezo oscillator, a small motor used in a mobile phone terminal vibrator, or the like, so that the effects of the present invention can be acquired at a still lower cost. Further, the effects can also be acquired through implementing the exemplary embodiment simply by adding and replacing software with existing apparatuses.

Third Exemplary Embodiment

Regarding an electronic apparatus according to a third exemplary embodiment of the present invention, the main difference with respect to the above-described first exemplary embodiment is that the visual sense display unit and the tactual sense presenting unit are spatially separated. Since the visual sense display unit and the tactual sense presenting unit are spatially separated, it is not required to set the size of the visual sense objects and the size of the tactual sense objects showing the operation targets to be consistent. The relative positions of the displayed objects on the visual sense display unit and the relative positions of the tactual sense objects presented on the tactual sense presenting unit may simply be set to be almost consistent. This exemplary embodiment is a case where the present invention is applied to an interface apparatus for drivers within automobiles while assuming a case used by those who are not visually impaired.

Hereinafter, the interface apparatus will be described in details by using a case of temperature setting operations of an air-conditioning device by referring to FIG. 18 and FIG. 19.

Figure 18:
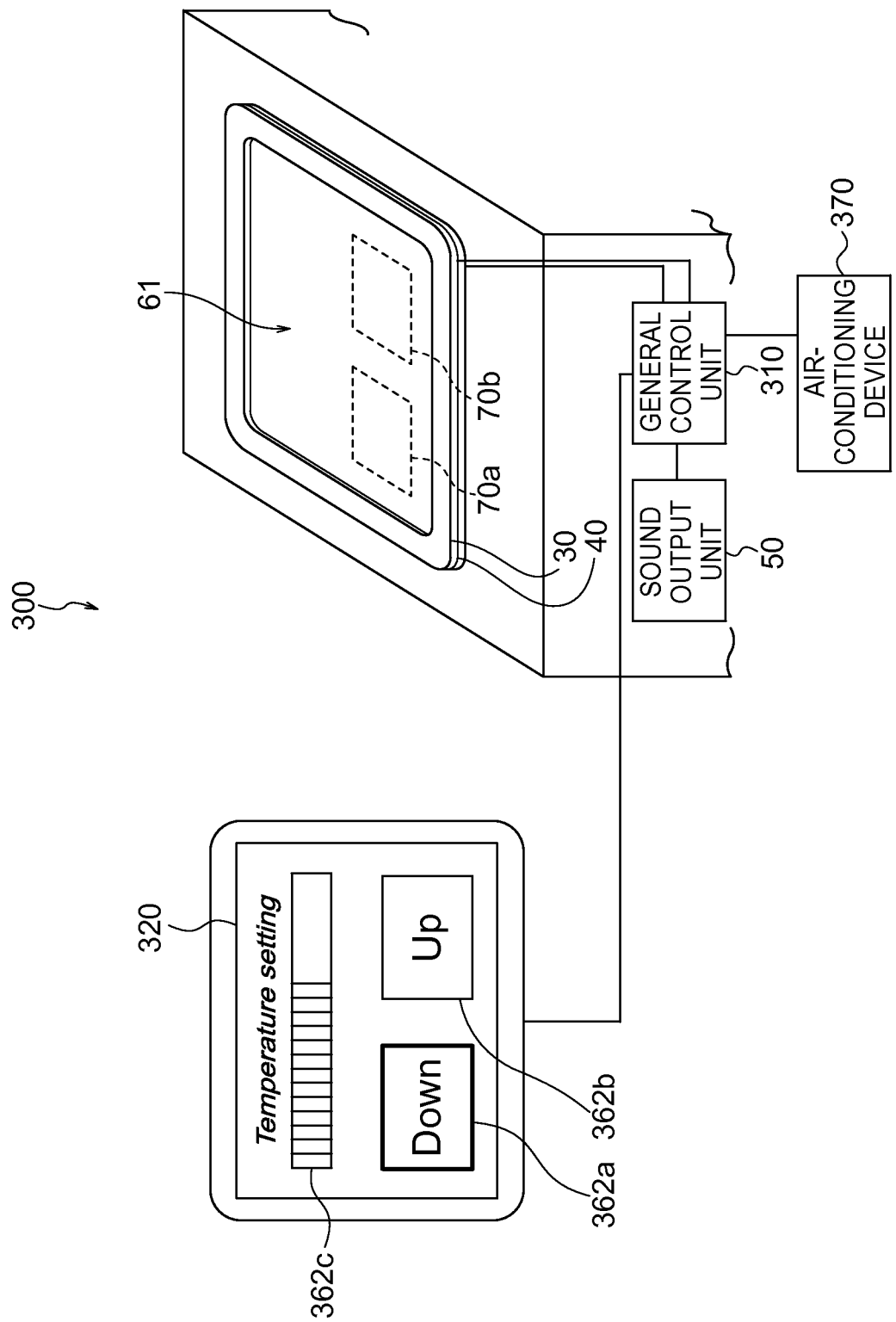
FIG. 18 is an explanatory chart showing structures of an electronic apparatus according to a third exemplary embodiment.
Figure 19:
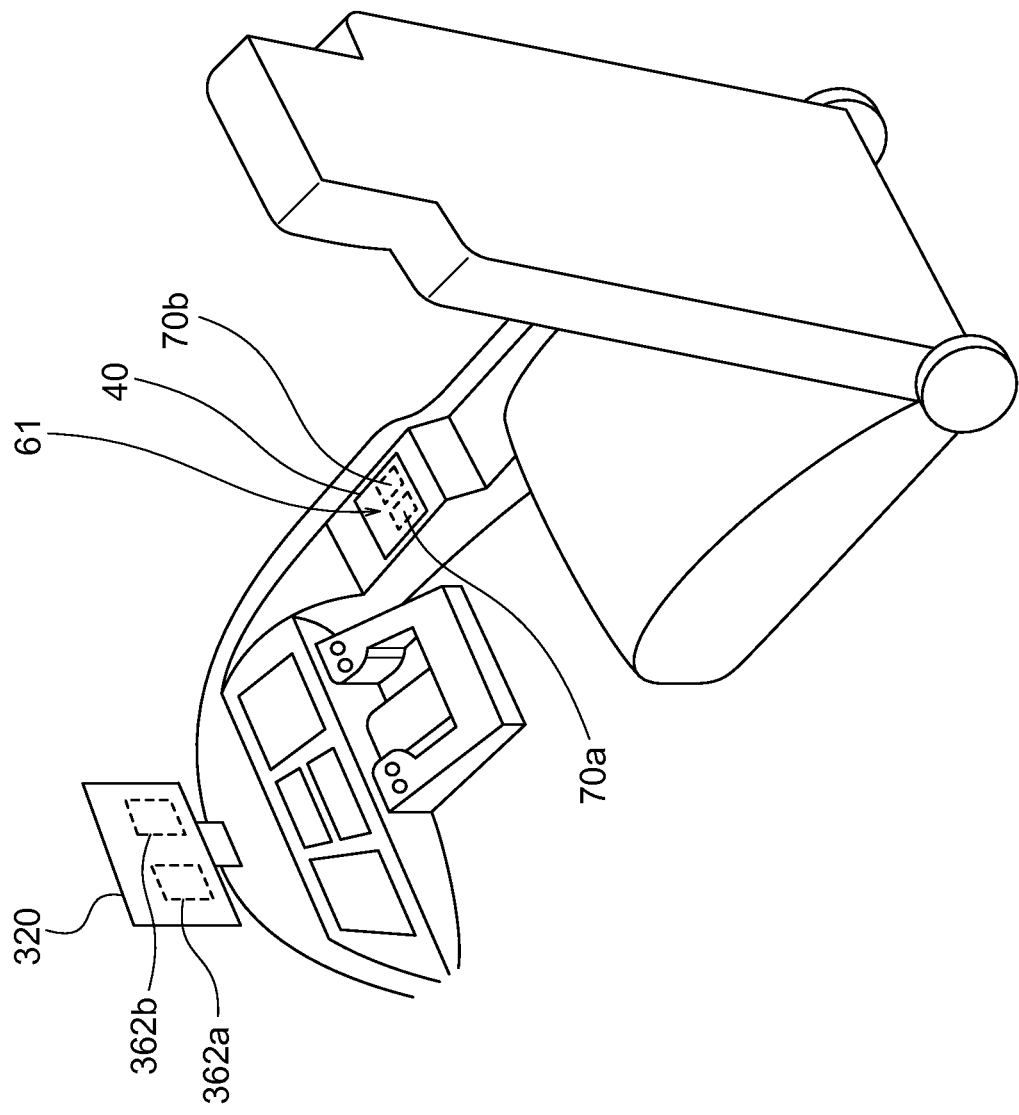
FIG. 19 is an explanatory chart showing a mobile unit on which the electronic apparatus shown in FIG. 18 is loaded.

FIG. 18 is an explanatory chart showing the structures of an electronic apparatus 300 according to the third exemplary embodiment, and FIG. 19 is a mobile unit to which the electronic apparatus 300 is loaded. The electronic apparatus 300 includes many structures and contents that are in common to the electronic apparatus 100 according to the first exemplary embodiment described above, so that same names and reference numerals as those of the first exemplary embodiment are applied to those that are in common.

The electronic apparatus 300 includes the tactual sense presenting unit 40 and the touch coordinate detection unit 30 which are in common to the first exemplary embodiment in the operation target range 61. In the meantime, a visual sense display unit 320 is not integrated with the tactual sense presenting unit 40 and the touch coordinate detection unit 30 but structured to be able to be disposed at an arbitrary place. The visual sense display unit 320 is a projector-type display device that is constituted with a transparent screen for visible light and a projection optical system. Since the visual sense display unit 320 can be disposed independently from the operation target region 61, each of the visual sense display unit 320 and the operation target range 61 can be disposed at the best positions for the user to use. As a result, the effect of improving the usability can be acquired.

As shown in FIG. 19, the visual sense display unit 320 is provided on a dashboard in front of the driver's seat and functions as a head-up display for the user. In the meantime, the operation target range 61 constituted by including the tactual sense presenting unit 40 and the touch coordinate detection unit 30 is disposed near the place where the fingers of right hand are to be located when the user places the right arm on the armrest.

In the tactual sense presenting unit 40, tactual sense objects 70a and 70b corresponding to displayed objects 362a and 362b displayed on the visual sense display unit 320 are presented. The displayed object 362a is displayed in the lower half and left half part region of the screen of the visual sense display unit 320. The tactual sense object 70a corresponding thereto is displayed on the lower half and left half of the operation target region 61. The displayed object 362b is displayed in the lower half and right half part region of the screen of the visual sense display unit 320. The tactual sense object 70*b* corresponding thereto is displayed on the lower half and right half of the operation target region 61.

Unlike the case of the first exemplary embodiment, the visual sense display unit 320 is not integrated with the tactual sense presenting unit 40 in the third exemplary embodiment. Therefore, there is no concept of aligning the edge of the displayed object 362*a* and the edge of the tactual sense object 70*a*. Thus, in this exemplary embodiment, the general control unit 310 performs control and drive so that the relative positional relation of the displayed objects 362*a* and 362*b* displayed on the visual sense display unit 320 and the relative positional relation of the tactual sense objects 70*a* and 70*b* presented on the tactual sense presenting unit 40 become roughly consistent. Alternatively, the general control unit 310 performs control and drive so that the figure acquired by two-dimensionally seeing the visual sense display unit 320 and the displayed objects 362*a*, 362*b* and the figure acquired by two-dimensionally seeing the operation target range 61 and the tactual sense objects 70*a*, 70*b* come to be in almost similar relations.

While the general control unit 310 includes the operation content acquiring module as in the case of the first exemplary embodiment, the functions thereof are different from those of the first exemplary embodiment. That is, the operation content acquiring module of the third exemplary embodiment is controlled to execute prescribed functions that are corresponded to the tactual sense objects 70*a*, 70*b* when an action of pounding (a tap operation) the operation target range 61 at the positions corresponding to the tactual sense objects 70*a*, 70*b* is detected.

As in the case of the first exemplary embodiment, in a state where input operations by the user are to be accepted, a sense of texture is locally presented in the regions of the tactual sense objects 70*a*, 70*b*. That is, the tactual sense presenting unit 40 is driven to present a sense of texture in the regions of the tactual sense objects 70*a*, 70*b* at a point before the user touches the regions of the tactual sense objects 70*a*, 70*b*.

The air-conditioning device 370 is connected to the general control unit 310. A temperature display region 362*c* is provided in the visual sense display unit 320.

Next, a case where the user selects and inputs the displayed object 362*a* with "Down" shown in FIG. 18 will be described. In this exemplary embodiment, the user visually recognizes the visual sense display unit 320 to recognize the positions and functions of the displayed objects 362*a*, 362*b*, and operates the operation target region 61. The tactual sense objects 70*a*, 70*b* are presented at the positions corresponding to the displayed objects 362*a*, 362*b* in the operation target region 61. Thus, it is possible to know the position to be tapped without visually recognizing the operation target range 61.

The user who intends to lower the temperature visually perceives the visual sense display unit 320 to recognize that the displayed object 362*a* for lowering the set temperature is at a lower left part and the displayed object 362*b* for increasing the set temperature is at a lower right part. Thereafter, the user searches the operation target range 61 to perceive the tactual sense objects 70*a*, 70*b* arranged on the left and right sides, and performs a tap operation at the position of the tactual sense object 70*a*.

While the control of the setting temperature of the air-conditioning device 370 is described in this exemplary embodiment, the present invention is not limited only to such case but can be applied to operate and control various kinds of incidental apparatuses.

Effects of Third Exemplary Embodiment

The effects of the electronic apparatus 300 according to the third exemplary embodiment and the mobile unit to which the apparatus is loaded will be described. One of the effects is that the usability can be improved by disposing each of the visual sense display unit 320 and the operation target range 61 at the best positions for the user to use them.

The user is obliged to pay attention to the front view while driving. In the example of the mobile unit shown in FIG. 19, the visual sense display unit 320 is provided extremely near the lines of sight to be looked by the user for paying attention, and the set temperature can be decreased or increased without looking at the operation target range. Thus, the user can perform the operation of the air-conditioning device 370 while concentrating on execution of the obligation to pay attention to the front, thereby making it possible to continue safe driving.

The other effect is that the positions of the tactual sense objects 70*a*, 70*b* perceived by the user when the user searches the tactual sense objects 70*a*, 70*b* are constant regardless of the speed of the finger, so that the user can know the position to perform a tap operation correctly.

The reason thereof is that the tactual sense presenting unit 40 is driven to present a sense of texture to the regions of the tactual sense objects 70*a*, 70*b* at a point before the user touches the regions of the tactual sense objects 70*a*, 70*b* as in the case of the first exemplary embodiment. Thus, there is no shift generated between the positions of the tactual sense objects 70*a*, 70*b* and the positions of the tactual sense objects 70*a*, 70*b* perceived by the user.

In the meantime, when the related techniques are applied, steps of detecting the touch coordinate of the finger of the user, comparing whether or not the detected coordinate is within a prescribed region (a region for accepting tap operations) determined in advance, and generating a signal for driving the actuator to oscillate the touch surface when the touch coordinate is within the region are executed. Thus, there is a time lag generated between the point where the finger of the user enters the region and the point where the touch surface is oscillated. This generates a shift between the region and the position at which the finger is at when a tactual sense is generated. That is, the position of the region for accepting the tap operation perceived by the user with a tactual sense and the position of the region where the tap operation is actually accepted become different.

Note that the tactual sense presenting unit 40 which localizes and presents a tactual sense is not limited to the structure described in the first exemplary embodiment, i.e., the structure in which XY-electrodes are provided in matrix. For example, the structure depicted in Patent Document 1 in which a plurality of segment electrodes are provided on a substrate can be used. Alternately, the structure depicted in WO 2011/052484 (Patent Document 5) in which a plurality of shape-memory alloys are provided on a substrate can be used. Further, the structure depicted in Unexamined Patent Application Publication 2008/0204420 (Patent Document 6) in which tactile perception pins are arranged in matrix can be used. Furthermore, structures that can be estimated from those documents, e.g., a structure in which a plurality of piezo oscillators are arranged in matrix on a surface, can be used.

Expansion of Exemplary Embodiments

Various kinds of expansions can be done on the first to third exemplary embodiments described above within a range not departing from the spirit thereof. The expansions will be described hereinafter.

In each of the exemplary embodiments described above, when the user performs "tap" operation, the operation content is given by the application execution module 11 to the working software. In both of the first and second exemplary embodiments, "tap" can be replaced with "push-in", i.e., an operation of increasing the pushing force when the finger set still at the same touch position of an operation of "long press-down" is in a still state.

In this case, a load sensor may be added further to the operation target range (the visual sense display unit 20, the touch coordinate detection unit 30, and the tactual sense presenting unit 40) to judge that there is an occurrence of "push-in" upon detecting that the pushing force is increased. Further, the operation content acquiring module 14 (or 214) may be structured to be able to detect the area of the finger that is in contact with the operation target range to judge that there is an occurrence of "push-in" upon detecting that the area is expanded. The electronic apparatus of this case is controlled to execute a prescribed function corresponded to the displayed object via the application execution module 11 when the operation content acquiring module 14 detects a push-in action on the operation screen at the position corresponding to the displayed object.

While the present invention has been described by referring to the specific embodiments shown in the drawings, the present invention is not limited only to the embodiments shown in the drawings. Any known structures can be employed as long as the effects of the present invention can be achieved therewith.

While a part of or the entire part of the exemplary embodiments can be summarized exemplary embodiments as in following Supplementary Notes, the present invention is not necessarily limited to those structures.

(Supplementary Note 1)

An electronic apparatus, including: a visual sense display unit which displays an operation screen including an operation target range for a user; a touch coordinate detection unit which detects a content of a touch operation done by the user on a displayed object that is displayed within the operation target range; and a tactual sense presenting unit which presents a tactual sense that can be perceived by the user on the operation screen, the electronic apparatus including:

a tactual sense presentation control module which presents a tactual sense corresponding to the displayed object to the user on the operation screen via the tactual sense presenting unit;

an operation content acquiring module which detects whether or not a temporal change in a touch position detected on the displayed object by the touch coordinate detection unit is equal to or less than a preset threshold value and whether or not such state continues for a preset time or longer; and a sense stimulus information output control module which outputs sense stimulus information corresponding to the displayed object to outside via a sense stimulus information output unit provided in advance, when the state continues for the preset time set or longer.

(Supplementary Note 2)

The electronic apparatus as depicted in Supplementary Note 1, wherein the sense stimulus information is a sound.

(Supplementary Note 3)

The electronic apparatus as depicted in Supplementary Note 1, wherein the tactual sense presenting unit is structured to be capable of presenting different tactual senses simultaneously in a first region and a second region on the operation screen.

(Supplementary Note 4)

The electronic apparatus as depicted in Supplementary Note 3, wherein the tactual sense presentation control module drives the tactual sense presenting unit to present a tactual sense that can be perceived by the user for the position based on a display position of the displayed object at a point before the user performs a touch operation.

(Supplementary Note 5)

The electronic apparatus as depicted in Supplementary Note 4, wherein:

the tactual sense presenting unit includes a supporting substrate, a plurality of X-electrodes extended in parallel to each other along a first direction on the supporting substrate, and a plurality of Y-electrodes extended in parallel to each other along a second direction on the supporting substrate while being insulated from the X-electrodes mutually, and a driving circuit which applies a voltage signal of a first frequency to the X-electrode corresponding to a target region inputted from outside out of each of the X-electrodes and applies a voltage signal of a second frequency to the Y-electrodes corresponding to the target region out of each of the Y-electrodes, the first and second frequencies are both 500 Hz or larger; and there is a period where an absolute value of a difference between the first and second frequencies is larger than 10 Hz and less than 1000 Hz.

(Supplementary Note 6)

The electronic apparatus as depicted in Supplementary Note 1, including an oscillation presentation control module which controls actions of an oscillation presenting unit that is provided in advance instead of the tactual sense presenting unit so as to directly oscillate the entire operation target range when the operation content acquiring module detects the touch position on the displayed object.

(Supplementary Note 7)

The electronic apparatus as depicted in Supplementary Note 1, wherein the operation content acquiring module is controlled to execute a prescribed function corresponded to the displayed object upon detecting a tap action on the operation screen at a position corresponding to the displayed object.

(Supplementary Note 8)

The electronic apparatus as depicted in Supplementary Note 1, wherein the operation content acquiring module is controlled to execute a prescribed function corresponded to the displayed object upon detecting a push-in action on the operation screen at a position corresponding to the displayed object.

(Supplementary Note 9)

An electronic apparatus, including:

a tactual sense presenting unit which is capable of presenting different tactual senses simultaneously on a surface;

a touch detection unit which detects a contact of a user made on the tactual sense presenting unit;

a tactual sense object that is presented by changing a tactual sense in a prescribed region of the tactual sense presenting unit; and a tactual sense presentation control module which drives the tactual sense presenting unit to present the tactual sense object at a point before the user touches the tactual sense object, wherein an action corresponded to the tactual sense object is executed when a prescribed touch action for the tactual sense object is detected.

(Supplementary Note 10)

The electronic apparatus as depicted in Supplementary Note 9, further including:

a visual sense display unit which is spatially separated from the tactual sense presenting unit; and a control unit which performs a control so that a relative position of displayed objects displayed on the visual sense display unit and a relative position of the tactual sense objects presented on the tactual sense presenting unit become substantially consistent.

(Supplementary Note 11)

An operation control method for controlling operations of an electronic apparatus including a visual sense display unit which displays an operation screen including an operation target range for a user, wherein:

an operation screen display control module creates the operation screen that is a content acquired when an application execution module executes processing, and displays the operation screen on the visual sense display unit;

a tactual sense presentation control module presents a tactual sense corresponding to the operation screen that can be perceived by the user within the operation target range on the operation screen via a tactual sense presenting unit;

a touch coordinate detection unit detects a content of a touch operation done by the user on a displayed object displayed within the operation target range;

an operation content acquiring module detects whether or not a temporal change in a touch position detected on the displayed object is equal to or less than a preset threshold value and such state continues for a preset time or longer; and a sense stimulus information output control module outputs sense stimulus information corresponding to the displayed object to outside via a sense stimulus information output unit provided in advance when the state continues for the present time or longer.

(Supplementary Note 12)

The operation control method as depicted in Supplementary Note 11, wherein the sense stimulus information is a sound.

(Supplementary Note 13)

The operation control method as depicted in Supplementary Note 11, wherein a step of presenting a tactual sense by the tactual sense presenting unit is a step in which the tactual sense presenting unit presents, based on a display position of the displayed object on the operation screen, a tactual sense that can be perceived by the user at that position.

(Supplementary Note 14)

The operation control method as depicted in Supplementary Note 11, wherein:

the operation content acquiring module detects whether or not there is a tap action on the operation screen at a position corresponding to the displayed object; and the operation content acquiring module makes the application execution module execute the operation content corresponding to the displayed object when the tap action is detected.

(Supplementary Note 15)

An operation control program used in an electronic apparatus including a visual sense display unit which displays an operation screen including an operation target range for a user, a touch coordinate detection unit which detects a content of a touch operation done by the user on a displayed object that is displayed within the operation target range, and a tactual sense presenting unit which presents a tactual sense that can be perceived by the user on the operation screen, the program causing a processor provided to the electronic apparatus to execute:

a procedure for creating the operation screen that is a content acquired by executing processing and for displaying the operation screen on the visual sense display unit;

a procedure for presenting a tactual sense corresponding to the operation screen that can be perceived by the user within the operation target range on the operation screen via a tactual sense presenting unit;

a procedure for detecting a content of a touch operation done by the user on the displayed object displayed within the operation target range;

a procedure for detecting whether or not a temporal change in a touch position detected on the displayed object is equal to or less than a preset threshold value and such state continues for a preset time or longer; and a procedure for outputting sense stimulus information corresponding to the displayed object to outside by a sense stimulus information output control module via a sense stimulus information output unit provided in advance when the state continues for the present time or longer.

(Supplementary Note 16)

The operation control program as depicted in Supplementary Note 15, wherein the sense stimulus information is a sound.

(Supplementary Note 17)

The operation control program as depicted in Supplementary Note 15, wherein the procedure for presenting a tactual sense by the tactual sense presenting unit is a procedure for presenting a tactual sense that can be perceived by the user at a position corresponding to the displayed object on the operation screen.

(Supplementary Note 18)

The operation control program as depicted in Supplementary Note 15, further causing the processor to execute:

a procedure for detecting whether or not there is a tap action on the operation screen at a position corresponding to the displayed object; and a procedure for executing the operation content corresponding to the displayed object when the tap action is detected.

INDUSTRIAL APPLICABILITY

The present invention can be applied to all the electronic apparatuses to which a touch panel is loaded. A measure for making it possible for those with impaired vision may be required not only with ticket vending machines, ATMs, multimedia kiosk terminals devices, and the like described above but also with smartphones, tablet terminals, notebook-type personal computers, and the like which are assumed to be owned and used by individuals, so that there is a significance in employing the present invention thereto.

What is claimed is:

1. An electronic apparatus, comprising:
    a visual sense display unit which displays an operation screen including an operation target range for a user;
    a touch coordinate detection unit which detects a content of a touch operation done by the user on a displayed object that is displayed within the operation target range;
    a tactual sense presenting unit which presents a tactual sense that can be perceived by the user on the operation screen;
    at least one memory configured to store computer program code; and at least one processor configured to execute the computer program code to:
- present a tactual sense corresponding to the displayed object on the operation screen via the tactual sense presenting unit;
- detect whether a temporal change in a touch position detected on the displayed object by the touch coordinate detection unit is equal to or less than a preset threshold value and whether such state continues for one second or longer, and detect whether there is a tap action on the operation screen;
- output sound with which the user can understand a meaning of the displayed object via a sound output unit provided in advance, when the state continues for one second or longer, and not output the sound with which the user can understand the meaning of the displayed object via the sound output unit, when the state continues for less than one second; and
- execute a prescribed function corresponded to the displayed object upon detecting the tap action on the operation screen at a position corresponding to the displayed object regardless of whether the temporal change in the touch position is detected, wherein:

the tactual sense presenting unit comprises:
- a supporting substrate, a plurality of X-electrodes extended in parallel to each other along a first direction on the supporting substrate, and a plurality of Y-electrodes extended in parallel to each other along a second direction on the supporting substrate while being insulated from the X-electrodes mutually, the X-electrodes and the Y-electrodes being located on a plane on the supporting substrate and the first direction is orthogonal to the second direction, and
- a driving circuit which applies a voltage signal of a first frequency to the X-electrode corresponding to a target region inputted from outside out of each of the X-electrodes and applies a voltage signal of a second frequency to the Y-electrodes corresponding to the target region out of each of the Y-electrodes, the first and second frequencies are both 500 Hz or larger; and there is a period where an absolute value of a difference between the first and second frequencies is larger than 10 Hz and less than 1000 Hz.

2. The electronic apparatus as claimed in claim 1, wherein the at least one processor is further configured to execute the computer program code to control actions of an oscillation presenting unit that is provided in advance instead of the tactual sense presenting unit so as to directly oscillate the entire operation target range when the at least one processor detects the touch position on the displayed object.

3. The electronic apparatus as claimed in claim 1, wherein the at least one processor executes a prescribed function corresponded to the displayed object upon detecting a push-in action on the operation screen at a position corresponding to the displayed object.

* * * * *